US008838530B2

(12) United States Patent
Kasbekar et al.

(10) Patent No.: US 8,838,530 B2
(45) Date of Patent: Sep. 16, 2014

(54) METHOD AND SYSTEM FOR DIRECTORY MANAGEMENT

(75) Inventors: Kiron Kasbekar, Navi Mumbai (IN); Ghulam Mustafa, Navi Mumbai (IN)

(73) Assignee: The Information Company Private Limited, Mumbai (IN)

( * ) Notice: Subject to any disclaimer, the term of this patent is extended or adjusted under 35 U.S.C. 154(b) by 0 days.

(21) Appl. No.: 13/322,075

(22) PCT Filed: Jun. 2, 2010

(86) PCT No.: PCT/IN2010/000364
§ 371 (c)(1),
(2), (4) Date: Nov. 22, 2011

(87) PCT Pub. No.: WO2010/150277
PCT Pub. Date: Dec. 29, 2010

(65) Prior Publication Data
US 2012/0078845 A1    Mar. 29, 2012

(30) Foreign Application Priority Data
Jun. 3, 2009  (IN) .......................... 1347/MUM/2009

(51) Int. Cl.
*G06F 7/00* (2006.01)
*G06F 17/00* (2006.01)
(52) U.S. Cl.
USPC ........................................................ 707/609
(58) Field of Classification Search
None
See application file for complete search history.

(56) References Cited

U.S. PATENT DOCUMENTS

| 5,893,908 | A | 4/1999 | Cullen et al. | |
|---|---|---|---|---|
| 8,037,146 | B2 | 10/2011 | Carr et al. | |
| 2004/0103160 | A1* | 5/2004 | Sheldon et al. | 709/206 |
| 2008/0294674 | A1* | 11/2008 | Reztlaff et al. | 707/102 |
| 2009/0125597 | A1* | 5/2009 | Carr et al. | 709/206 |

OTHER PUBLICATIONS

"Merriam Webster's Collegiate Dictionary", 1997, Tenth Edition, p. 237.*
International Search Report and Written Opinion dated May 2, 2011 from PCT/IN2010/000364.
International Preliminary Report on Patentability corresponding to International Application No. PCT/IN2010/000364 dated Dec. 15, 2011.

* cited by examiner

*Primary Examiner* — Usmaan Saeed
*Assistant Examiner* — Michele Choi
(74) *Attorney, Agent, or Firm* — Ohlandt, Greeley, Ruggiero & Perle, L.L.P.

(57) ABSTRACT

System and method for extracting, retrieving and managing data in a computer or network of computers through an enhancement of the power of the directory management system and email management system by enabling users to superimpose a hierarchy of descriptors on top of the system, to share, import and export the hierarchy of descriptors between computers with controlled access for data objects. The method and system is defined particularly for selecting individual references from search engine results and saving them along with descriptors. The method and system automatically generate reports of work done in the computer or network of computers, including creation, modification, copying, moving and deletion of files and folders. The method and system reduces the clutter of information while ensuring that the system is automatically backed up in different modes and with complete flexibility to back up.

23 Claims, 40 Drawing Sheets

METHOD AND SYSTEM FOR DIRECTORY MANAGEMENT

FIELD OF INVENTION

The present invention relates to directory management and email management. More particularly the present invention relates to the extraction, retrieval and management of data in a computer or network of computers, and the enhancement of directory management systems in various operating systems used on computers and networks of computers.

BACKGROUND ART

The information in computers (and hence in networks of computers) is stored in the storage devices of the computers, in the form of hard disks, floppy disks, tape drives, USB drives and other such storage devices. The information is physically stored in digital form (for example, in hard disks, information is stored in different 'clusters' or areas of the devices), and cannot be seen by the user. To enable the user to retrieve information, the operating systems of computers use a method and system variously called a file management system or directory management system, which on the Microsoft Windows platform, for example, is called the Windows Explorer, and is known by various other names in various non-Microsoft systems, which we will hereinafter refer to as a "directory management system".

The directory management system helps users organize their files into folders, which can be divided into sub-folders, and sub-sub-folders, up to several lower levels, and all these are contained in 'partitions' (also known as 'directories') of the computer hard disk (or other storage device), and a computer may have one or more hard disks or other storage devices. The directories are usually structured in hierarchical form, or in 'tree' structures.

The directory management structure enables users to perform various actions on the files that contain information or computer instructions—including: create, name, rename, open, copy, paste, move and delete, besides sorting the file and folder lists by different columns (e.g., alphabetically by file name, by last modification date, by file size, by file format) to make it easier to find a file or folder. The directory structure is replicated in 'browse' windows that open in individual applications on the computer (e.g., MS Word, or Adobe Photoshop) when a user wishes to locate a file to open or to save a file. The file lists in the directories may also show previews of images or the first slide of a presentation or animation in a 'thumbnail' size.

In systems implemented for faster retrieval of data the feature of tags are incorporated. The tagging of data is well known as can be depicted form the prior arts below.

One prior art describes how tagging operation are performed to provide faster access to data by associating tags with the data. A tag may be a keyword associated to data objects. These objects can be given multiple tags. A search for data objects can be performed by looking for all objects that are tagged accordingly. However, one drawback associated with the prior art is that the tagging operations work only if the file format is capable of carrying such tag node structures. Further, only applications that consider these tag node structures in files are capable of working with tags.

Another prior art which provides an improvement over the previous prior art describes file system tagging by applications wherein the application includes creating tag associations for the file system by associating a tag with a file object. Associating the tag with a file object also includes allocating a tag structure for each tag in the file system. However, the drawback associated with this prior art is that the allocation of tag structures for each tag will create additional storage requirement and thereby increasing hardware requirement.

Yet another prior art describes a method for retrieving documents based on information other than the document content. The prior art provides a search mechanism conducting search and providing results based on tags associated with the documents.

The limitations of the application of tags are not only confined to file systems but it is extended to email as well.

One prior art discloses system implementing association of tags with email and sharing the tags with a portion of email users. The prior art provides a solution for slow and ineffective method for handling received email due to increasing volume of emails received.

In a related aspect to email tagging, another relevant prior art describes a method of tagging emails and providing tag clouds. The prior art provides a method for generating tag clouds for emails and stored in a central location and accessible to a collaborative community.

Another prior art discloses a tag-sharing application wherein a mechanism is provided by which a user's tags can be shared across a variety of websites, applications or services, in addition to those websites where a particular tag may have been created.

However, a major drawback of the above prior art is that tags are created and used with no differentiation between tags based on data types or such other variables. Also, the drawback associated with all the above prior art related to tagging is that the retrieval of data relevant to a user is not authenticated by controlled access. As a result when a tag is shared with another user all the data appended with those tags would be exhibited to that other user regardless of whether all the data under same tag is relevant to the user or not.

Therefore, it is required to formulate a system and/or a method to obviate the shortcoming associated with the prior arts above.

OBJECT OF THE INVENTION

With the massive in increase in the volume of information people have to deal with today, there is need for a multi-propertied tagging system that can deal effectively with complex search/content retrieval requirements. The object of the current invention is to enable users to deal with the complexity by creating and using diverse descriptors (describing various data objects, including files, folders, emails, etc.) that serve different purposes, and can be based on different data types—so that the descriptors (or tags) can retrieve data through computation (as in locating tags in a numeric or date range or by Boolean logic and fetching lists of data objects that are tagged with such descriptors).

Certain applications require tagging different data objects with same tags to obviate additional tagging and prevent additional storage requirement. However, consider a scenario where a particular tag embodying several data objects is shared by the user with another user entity, if there is no arrangement employed for controlled access with other user entity then all the objects under the specified tags would be shared with that other user entity which would be an undesirable event. One way to obviate such an occurrence is to tag all objects with different names but that would again increase the storage requirements and multiple tag requirements.

Further, when a search operation based on tags is executed for extracting a data object, the search results would display all the objects within the tag names regardless of whether the user conducting the search should really be accessing some of the data objects.

The object of the present invention is to provide a system and a method of extracting, retrieving and managing data in a network of computers or a computer through an enhancement of the power of the directory management system and email management system by enabling users to superimpose a hierarchy of descriptors on top of the systems. The system further enables the sharing, importing and exporting of the hierarchy of descriptors between computers. The system is configured for facilitating controlled access to data objects with same descriptors. The method is defined particularly for selecting individual references from search engine result lists and saving them along with the descriptors. The system automatically generates reports of work done in the computer or network of computers, including creation, modification, copying, moving and deletion of files and folders. The system and method reduces the clutter of information while ensuring that the system is automatically backed up in different modes and with complete flexibility to back up.

SUMMARY OF THE INVENTION

The present invention describes a system and a method for directory management and email management. More particularly, the present invention discloses a system and a method of extracting, retrieving and managing data objects in a computer network or a computer by amalgamating the functionalities of descriptors to the objects.

In one embodiment the present invention describes a system comprising: at least one host terminal, at least one control module configured for initialization, control and execution of the system operation, a module for generating and managing at least one descriptor wherein said module manages descriptors by different data types for different purposes, including controlling access to files and folders, a module for appending descriptors to the object, at least one database for storing descriptor along with a link to the object wherein the descriptor database is created for fast retrieval of the object, a control and monitoring module configured for sharing, importing and/or exporting the descriptor, said control and monitoring module is configured for facilitating controlled access even to objects appended with same descriptor, and said control and monitoring module is further configured for synchronization of the object, descriptors and descriptor based object synchronization, a module for executing search mechanism to perform search for a descriptor based query, a means for retrieving stored objects with appended descriptors as the search results wherein the objects retrieved are other than objects controlled by the control and monitoring module, and a module for flexible and configured backup of information regarding objects and/or descriptors.

In another embodiment of the present invention a method of extracting, retrieving and managing data in a network of computers or a computer is disclosed. The method comprises steps of selecting at least one object, creating and/or defining one or more descriptors wherein the descriptors can be of various data types, appending at least one said descriptor to said object, storing the descriptor in a database along with a link to the object, managing descriptors by different data types for different purposes, including controlling access to files and folders, performing a search on descriptor based query processed by a mechanism executing the search process, providing a search result to a user after verification of authentication in response to a descriptor based query allowing to retrieve stored objects with appended descriptors wherein the objects retrieved are the objects allowed to be exhibited to that user after verification of authentication, sharing, importing or exporting said descriptor through controlled access, synchronizing the objects, descriptors and descriptor based objects, previewing information about objects by exhibiting appended descriptors, and generating reports respective to the task performed.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

Figure 1:
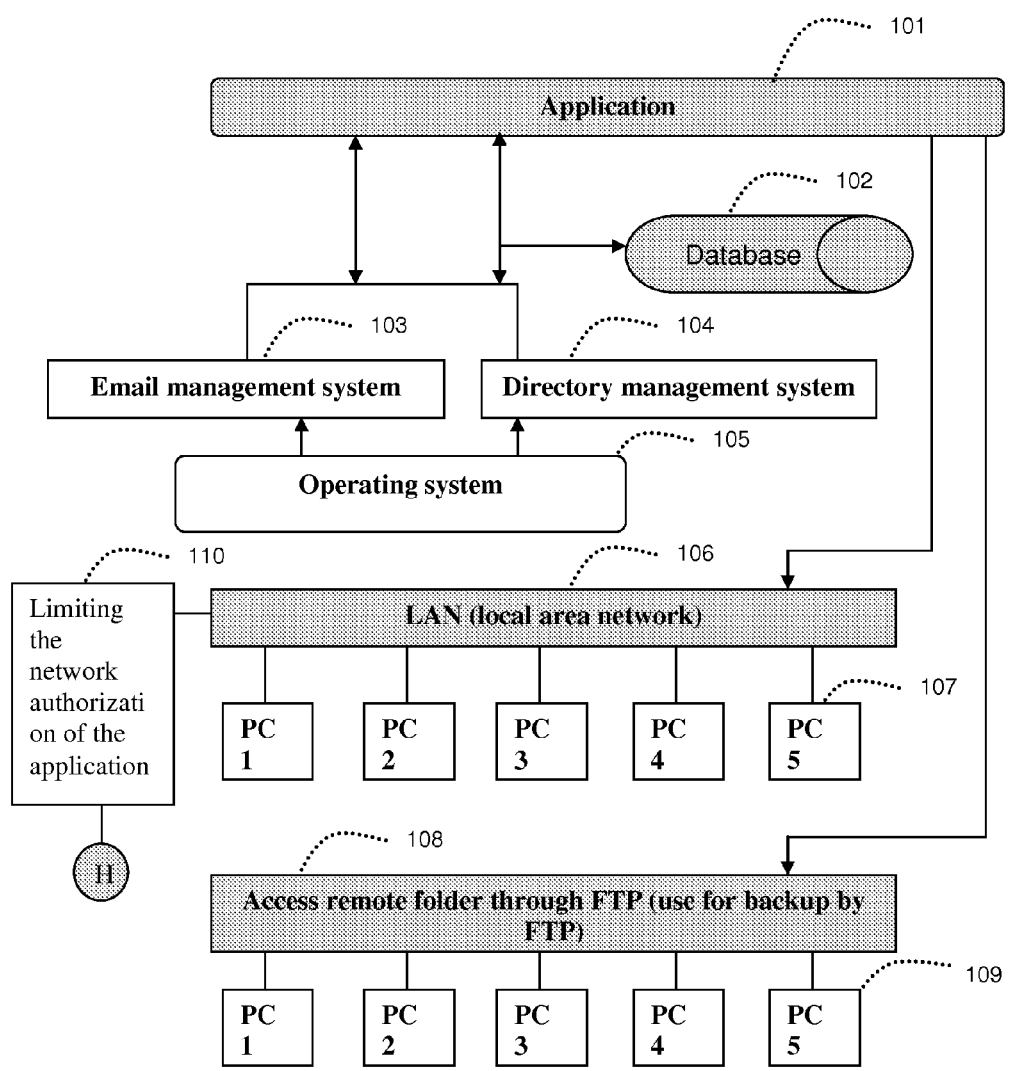
FIG. 1 gives a bird's eye-view of the process, in which 101 describes the application embodying the method and system of the current invention.

The present invention, herewith "Organyze", increases the power of the directory management and email management system by facilitating additional functionalities in the shape of controlled access to selected data objects embodied in same descriptors, which are currently not available in other systems, in order to help the user manage his files, folders and/or emails better, streamline work and work more productively by accessing only the required data objects and being able to see detailed descriptions and/or preview of the contents of data files or their properties. The detailed description may include information like for example, has an image file been purchased, and what are the terms of the purchase? Or has a report document been approved by the department head? Or has this file been forwarded to a colleague, and what are her comments on the charts in the file.

The present invention, i.e., Organyze, builds this power by using an SQL database-driven system and method, which provides a wide range of ways in which to enhance directory management systems and also may give users considerable flexibility in such use.

As per one embodiment the present invention may use "descriptors" of various kinds, including bookmarks (indicating relevance or importance), labels (describing the content), priorities (specifying the urgency or level of importance of the file, folder or email), groups (indicating the group in the organization for whom the file or folder would be of interest), and comments (multiple comments by one or more persons stating their views on the contents or other characteristics of the file).

In a related aspect, an individual user can not only create and attach descriptors to his files and folders, but the user can import hierarchies of descriptors from other users. In a more expatiate aspect, for example, a user organization can create a central labeling system, which, say, follows a standard industrial classification system; then the user can import such a central labeling system and use elements of it in his own personal labeling system. A user who has developed an effective labeling system can export it to others in the organization on request, allowing more people to use the system created by someone who is more skilled than them or has devoted more time to it than they have.

As per one beneficial embodiment, the present invention, i.e., Organyze, has also configured backup and synchronization processes in such a way that the descriptors may be maintained in the database, and can be restored even if the user's hard disk crashes or gets corrupted. In other words, not only do the files and folders get backed up, but so also do the descriptors and their links to the files and folders. This method and system may be different from other backup and synchronization methods and systems as it maintains copies of files and folders, plus a mapping of the paths of the files and folders in the directory system, and the links between the descriptors and the paths (which manifest themselves as 'attachments' to the files and folders).

The present invention, i.e., Organyze, may enable users to get reports of activity in their systems, in terms of files or folders created, modified, opened, renamed, moved, deleted, helping them in two ways—one, refreshing their memories about the files they had worked on, say, a week ago, and thus helping them retrieve files more easily; and two, allowing designated and authorized persons in the organization to see the work done by others on their machines in the local network.

Described herein are the various embodiments of the present invention, Organyze, which includes a method and a system for managing the information contents of a computer or network of computers through an enhancement of the power of the directory management system by enabling users to superimpose hierarchies of descriptors on top of the directory management system, to share, import and export the hierarchies of descriptors between computers with controlled access to data objects, a method and system for automatically generating reports of work done in the system, including creation, modification and deletion of files and folders in one or more machines, and methods and systems of management to synchronize files and folders between machines and to automatically back up information in different modes and with complete flexibility to back up different sections of the information in different places—on the same machine, on other machines, or at an external site, and in different configurations of types of formats to be back up and the numbers of versions to be retained, and including the various hierarchies of descriptors as well as files and folders and the database that stores the application data.

An exemplary embodiment of the present invention may be illustrated in the accompanying figures. These figures are intended to be illustrative, not limiting. Although the invention is generally described in the context of these embodiments, it should be understood that it is not intended to limit the scope of the invention to these particular embodiments. Further, data when referring to files, folders, message and/or emails and sometimes otherwise as well mentioned in the description from time to time can be and will be referred to as data object and/or object within the scope of this invention to address the collective types.

FIG. 1 gives a bird's eye-view of the process, in which 101 describes the application embodying the method and system of the current invention. The application uses an SQL database 102, and applies to an email management system 103 and the directory management system 104, both of which work with the help of the operating system 105 used to run the computer. The application is used by users of individual computers 107 or networks of computer users 106, and can be used to transfer information to remotely situated computers or networks of computers 109 through a file transfer protocol 108, with the option of limiting the authorization of the application in the network 110 to restrict the use of the application to the machine on which it is installed (details in FIG. 24).

Figure 1A:
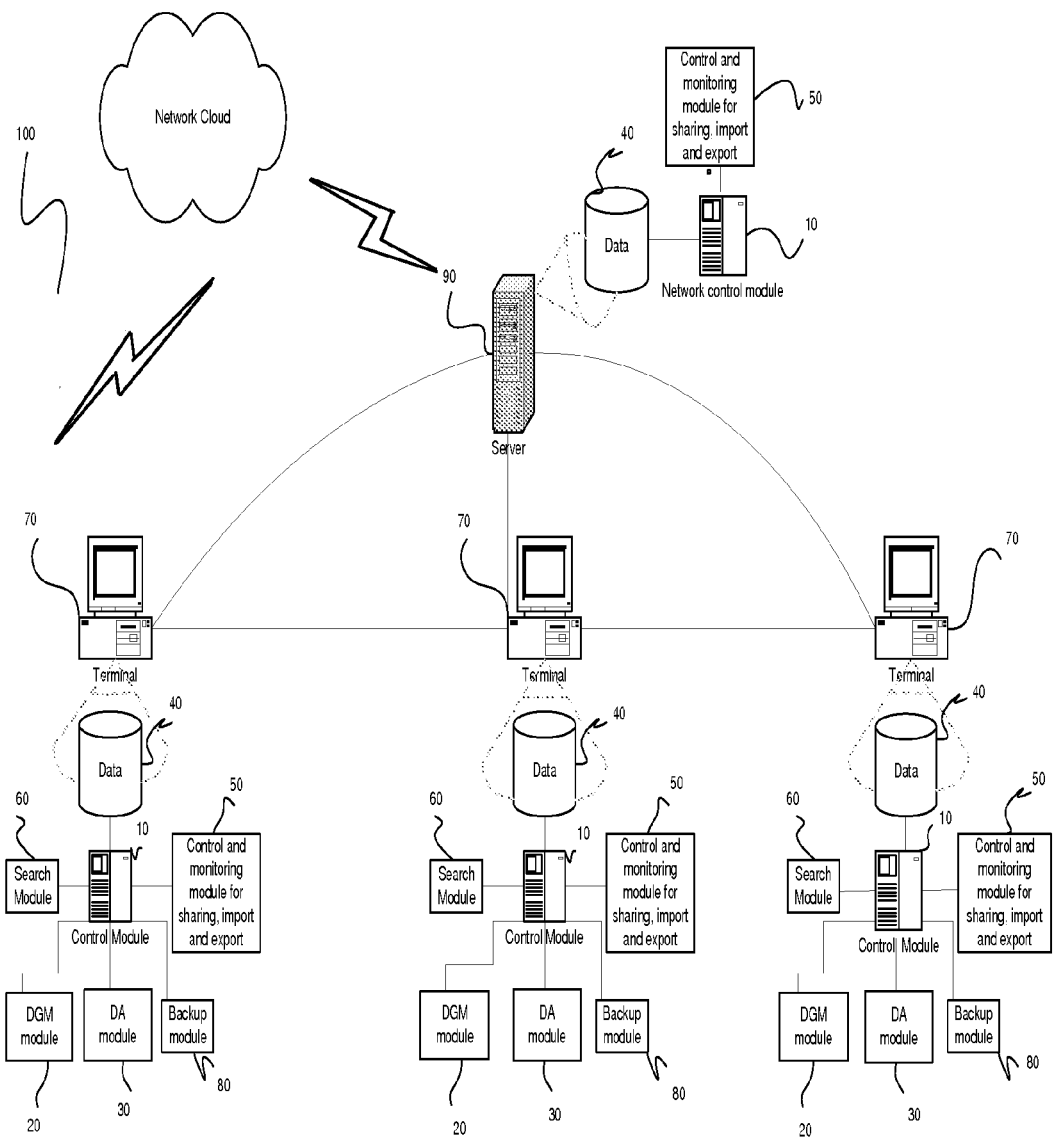
FIG. 1A shows the system for implementing the directory management and email management in a network of computers or a computer.

As per one embodiment of the present invention and as in FIG. 1A; the overview of system (100) is provided, in which the directory management and email management is implemented. The control module (10) initiates, controls and executes the desired operation. FIG. 1A reveals a descriptor generating and managing (DGM) module (20) for generating at least one descriptor; a descriptor appending (DA) module (30) for appending descriptors to the data/objects; at least one database (40) for storing descriptor along with the path of attachment to data wherein the descriptor database (40) is created for fast retrieval of data; a module (50) for control and monitoring of sharing, importing or exporting the descriptor between computers across a network; a search module (60) for executing search mechanism to perform search for a descriptor based query and characterized in that the means for retrieving stored data/objects with appended descriptors as the search results; at least one terminal (70) for controlling and displaying the results; a backup module (80) for flexible and configured backup of different sections of information at diverse locations; a server (90) for executing operation in a network environment.

As per another embodiment of the present invention, the control module (10) initiates and executes the synchronizing of descriptors and/or data/objects wherein the objects are synchronized based on selected synchronization format.

As per a significant embodiment of the present invention, the system can be implemented over a dedicated link or a wireless medium as can be seen in FIG. 11A.

In a descriptive embodiment the present invention describes a system comprising: at least one host terminal; at least one control module configured for initialization, control and execution of the system operation; a module for generating and managing at least one descriptor wherein said module manages descriptors by different data types for different purposes, including controlling access to files and folders; a module for appending descriptors to the object; at least one database for storing descriptor along with a link to the object wherein the descriptor database is created for fast retrieval of the object; a control and monitoring module configured for sharing, importing and/or exporting the descriptor; said control and monitoring module is configured for facilitating controlled access even to objects appended with same descriptor; and said control and monitoring module is further configured for synchronization of the object, descriptors and descriptor based object synchronization; a module for executing search mechanism to perform search for a descriptor based query; a means for retrieving stored objects with appended descriptors as the search results wherein the objects retrieved are other than objects controlled by the control and monitoring module; a module for flexible and configured backup of information regarding objects and/or descriptors.

In another embodiment of the present invention a method of extracting, retrieving and managing data in a network of computers or a computer is disclosed wherein the method comprises steps of selecting at least one object; creating and/or defining one or more descriptors wherein the descriptors can be of various data types; appending at least one said descriptor to said object; storing the descriptor in a database along with a link to the object; managing descriptors by different data types for different purposes, including controlling access to files and folders; performing a search on descriptor based query processed by a mechanism executing the search process; providing a search result to a user after verification of authentication in response to a descriptor based query; allowing to retrieve stored objects with appended descriptors wherein the objects retrieved are the objects allowed to be exhibited to that user after verification of authentication; sharing, importing or exporting said descriptor through controlled access; synchronizing the objects, descriptors and descriptor based objects; previewing information about objects by exhibiting appended descriptors; generating reports respective to the task performed.

In a related aspect to the system and method it is understood that the software and/or hardware for performing the steps according to the invention may be located at a terminal, payment router or an authorization host or any combination of these.

Figure 2:
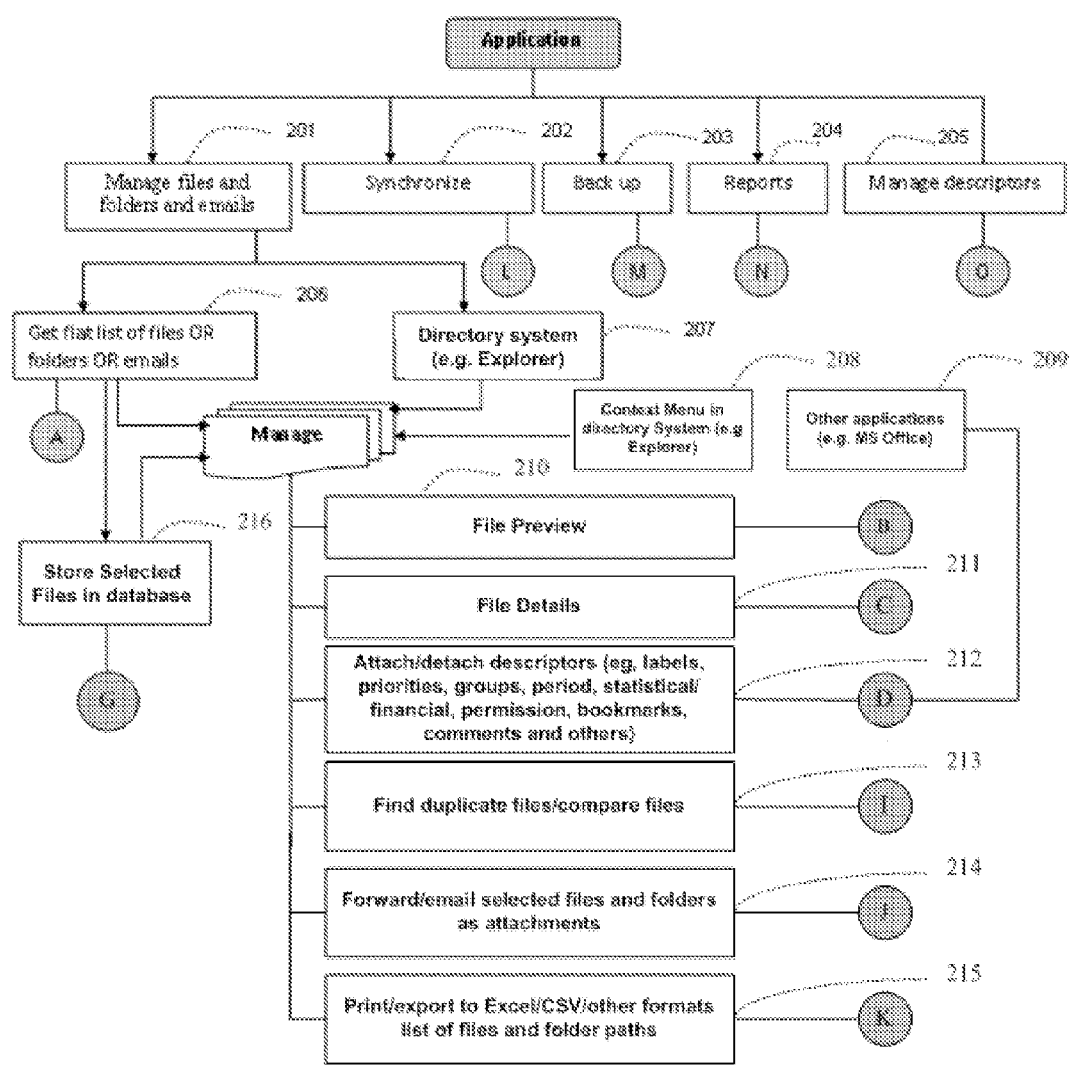
FIG. 2 describes the modules of the application, including managing files and folders 201, synchronization 202 (details in FIGS. 14 and 15), backup 203 (FIGS. 16 to 20), report generation 204 (details in FIG. 21), and managing descriptors 205 (details in FIGS. 22 and 23).
Figure 9:
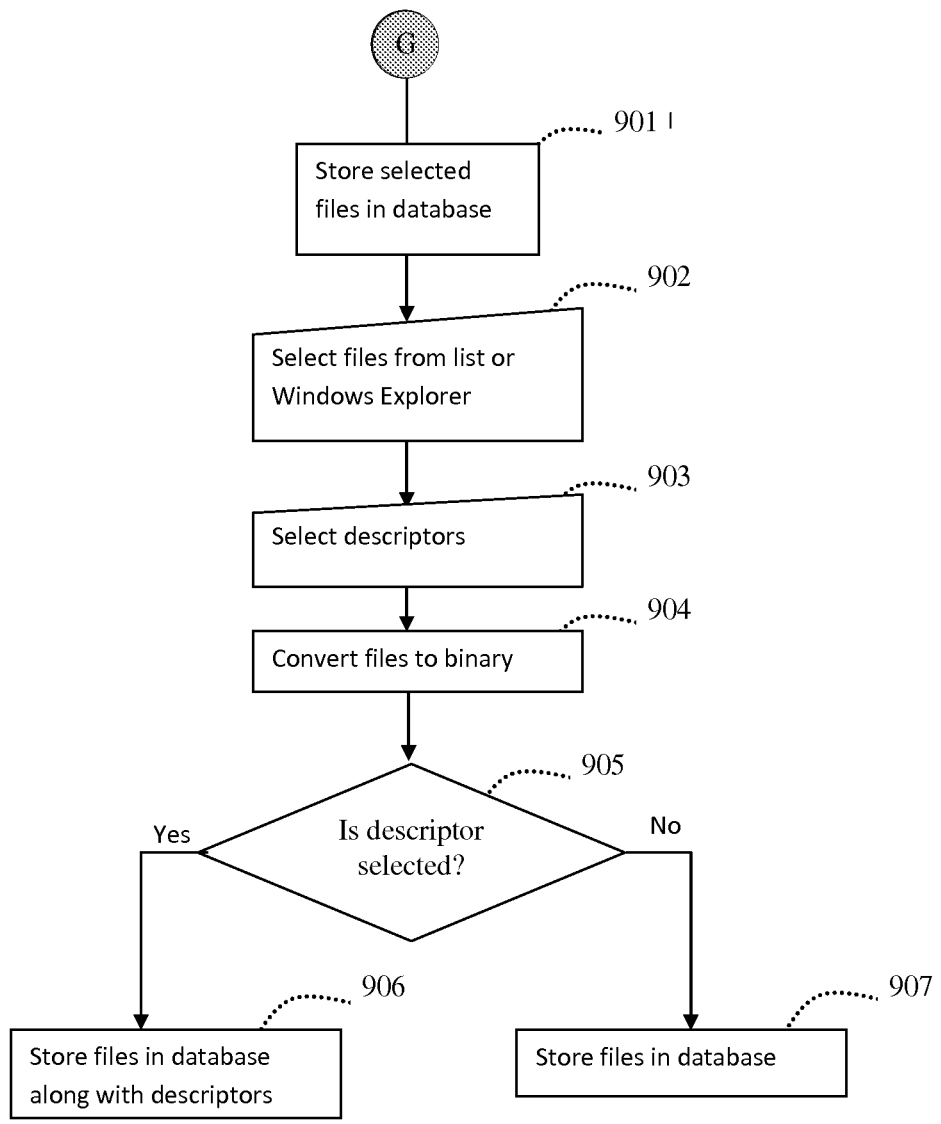
FIG. 9 explains the process of storing selected files in database by converting them to binary.
Figure 21:
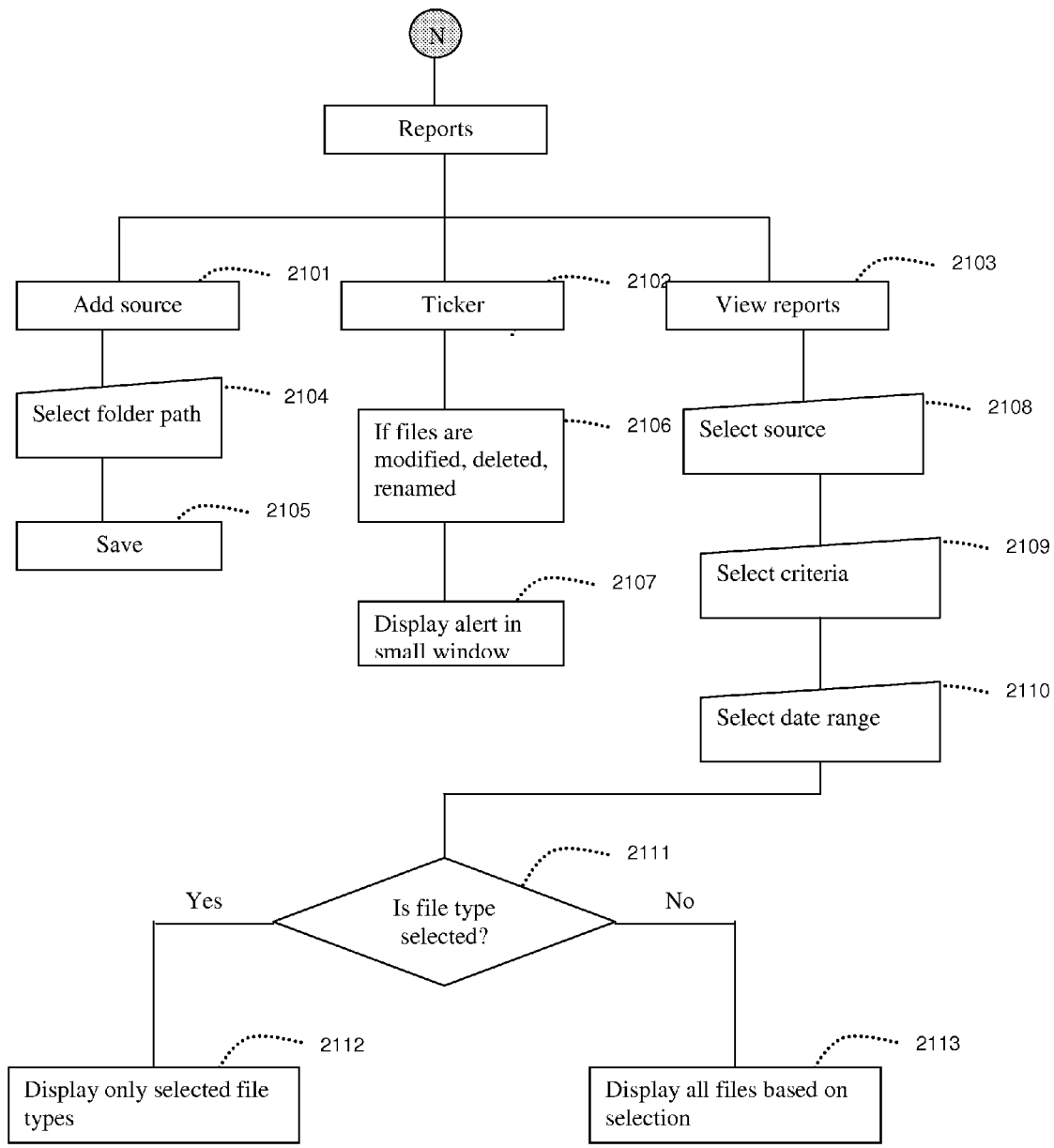
FIG. 21 represents the process of 'report' generation, which logs all actions taken in pre-determined areas of the system, including creation, modification, renaming, moving, and deleting files and folders.
Figure 22:
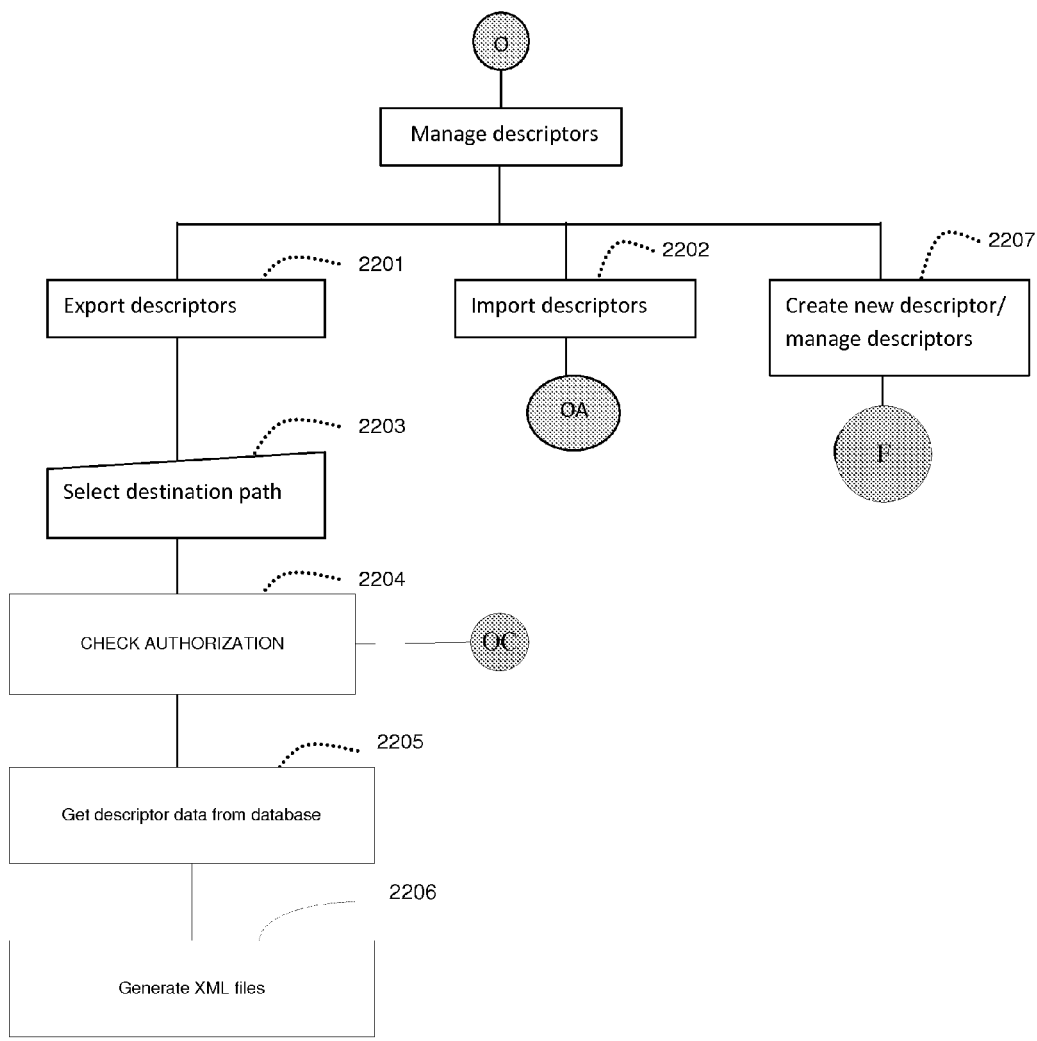
FIG. 22 shows the 'descriptor management' process. The user can export descriptors 2201 or import descriptors 2202 (details in FIG. 23).
Figure 23:
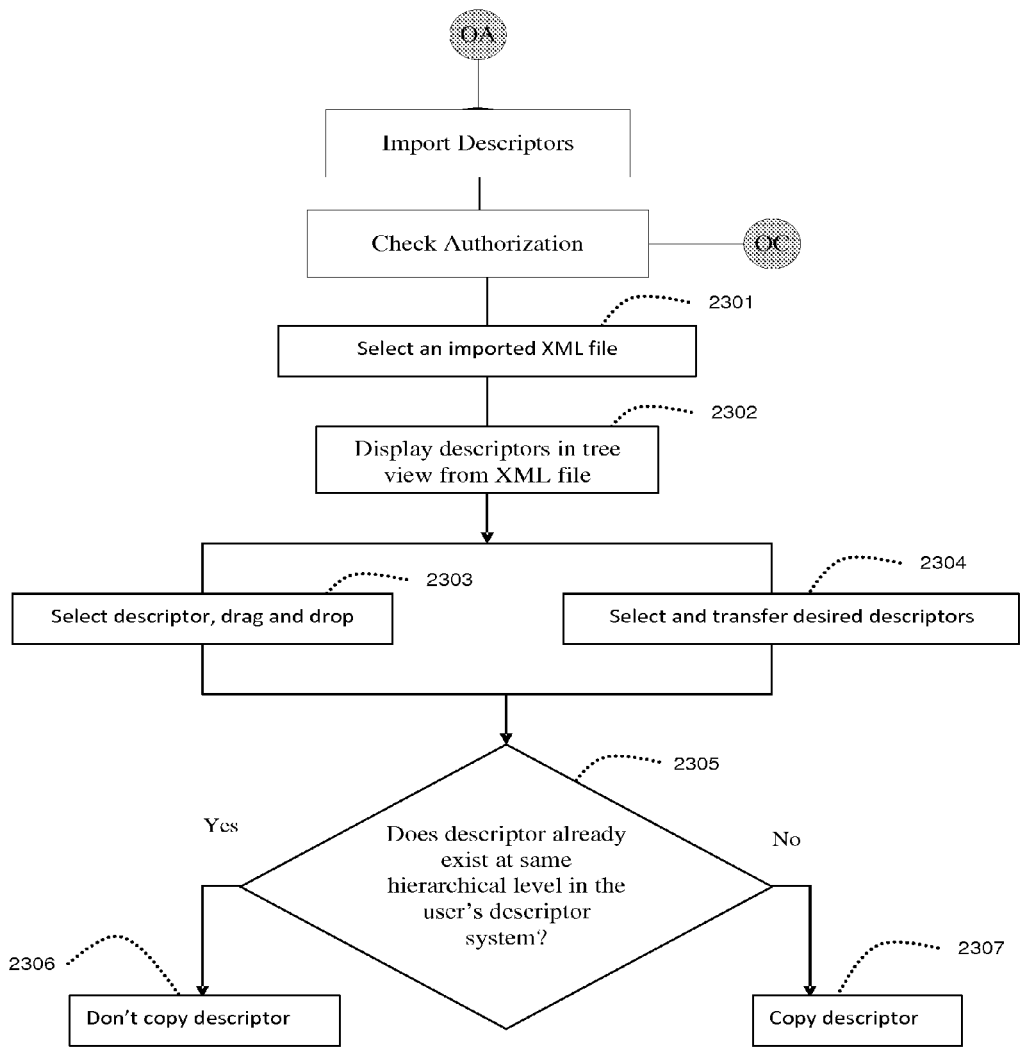
FIG. 23 continues with the 'descriptor management' process at the receiver end, where the user can select 2301 one of several imported XML files containing hierarchies of descriptors, and get a display of a "tree view" of the descriptor hierarchy 2302.

FIG. 2 describes the sections and modules of the application, including managing files and folders 201, synchronization 202 (details in FIG. 14 and FIG. 15), backup 203 (FIG. 16 to FIG. 20), report generation 204 (details in FIG. 21), and managing descriptors 205 (details in FIGS. 22 and 23). The file and folder management is done by generating displays (details in FIG. 3), of the list of contents of one or more folders, including flat, cross-folder, cross-directory, cross-drive, cross-computer lists 206 of files, folders and emails or calling the lists in a Windows Explorer (or similar) 207 pane in the same window, and enhancing the usability of such lists by enabling users to see file previews 210 (details in FIG. 4) and file details 211 (details in FIG. 5), attach/detach descriptor 212 (details in FIG. 6) wherein descriptors are inclusive of the types: attach/detach labels (details in FIG. 7A), attach/detach priorities (details in FIG. 7B), attach/detach groups (details in FIG. 7C), attach/detach period/duration (FIG. 7D), attach/detach financial/statistical objects (FIG. 7E), attach/detach permission descriptor (FIG. 7F), attach/detach bookmarks, (details in FIG. 7G), write/read/delete comments (details in FIG. 7H), find duplicate files 213 (details in FIG. 11), forward or email selected files or folders as attachments 214 (details in FIG. 12), and print or export 215 (details in FIG. 13) the lists of files and folders to a spreadsheet or comma separated value (CSV) or similar spreadsheet-readable file, or in a word-processor, PDF or other such file, along with the paths of the files and folders in order to help users to separately maintain lists for sorting, commenting or other (e.g., 'housekeeping') purposes. The descriptors can also be used as a utility tool in Context menu of directory system 208 and other applications 209. The application further mentions about the process of converting files to binary and saving them in database 216 (FIG. 9).

Figure 3:
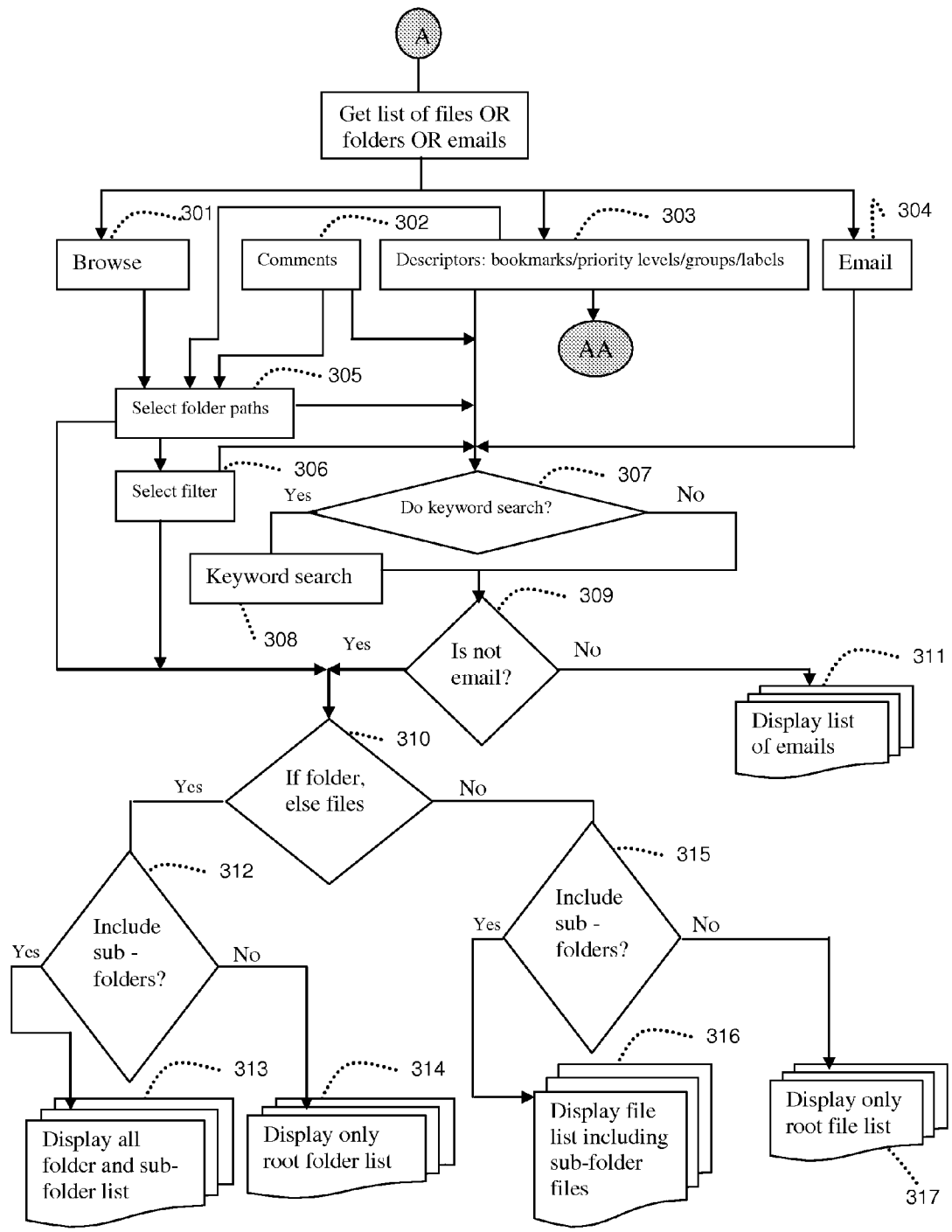
FIG. 3 describes how to get a display of files, folders, emails, and attached comments and descriptors.

FIG. 3 describes how to get a display of cross-folder, cross-directory, cross-drive, cross-computer lists 'A' of files, folders and/or emails through browsing and selecting 301, by choosing folder paths 305, one or more folders in one or more directories or drives or computers, and displaying the lists of files in the selected folders and, if desired, files or folders with comments 302 attached, or selecting bookmarks, priorities, groups or labels 303, or emails 304, selecting filters 306 in the case of files, folders and comments, selecting the option 307 whether to do a keyword search 308, verifying 309 whether the process involves emails and displaying flat lists of the results as email lists 311.

While selecting the folders and sub-folders from one or more folders, directories, drives or computers, the application offers the choice 310 of displaying only the folders or only the files in the selected folders. In case the user opts to see display of folders, the application also offers the choice 312 of including all sub-folders and sub-sub-folders or only displaying the list of sub-folders in the root of the selected folder, and then displaying a list 313 of all the selected folders and sub-folders in them, or displaying a list 314 of only the root of the selected folders.

Similarly, if the user opts to see the display of a list of files in the selection, the application offers the choice 315 to display 316 the complete list of files in all the sub-folders inside the selected folders, or display 317 only the files in the roots of the selected folders.

Figure 4:
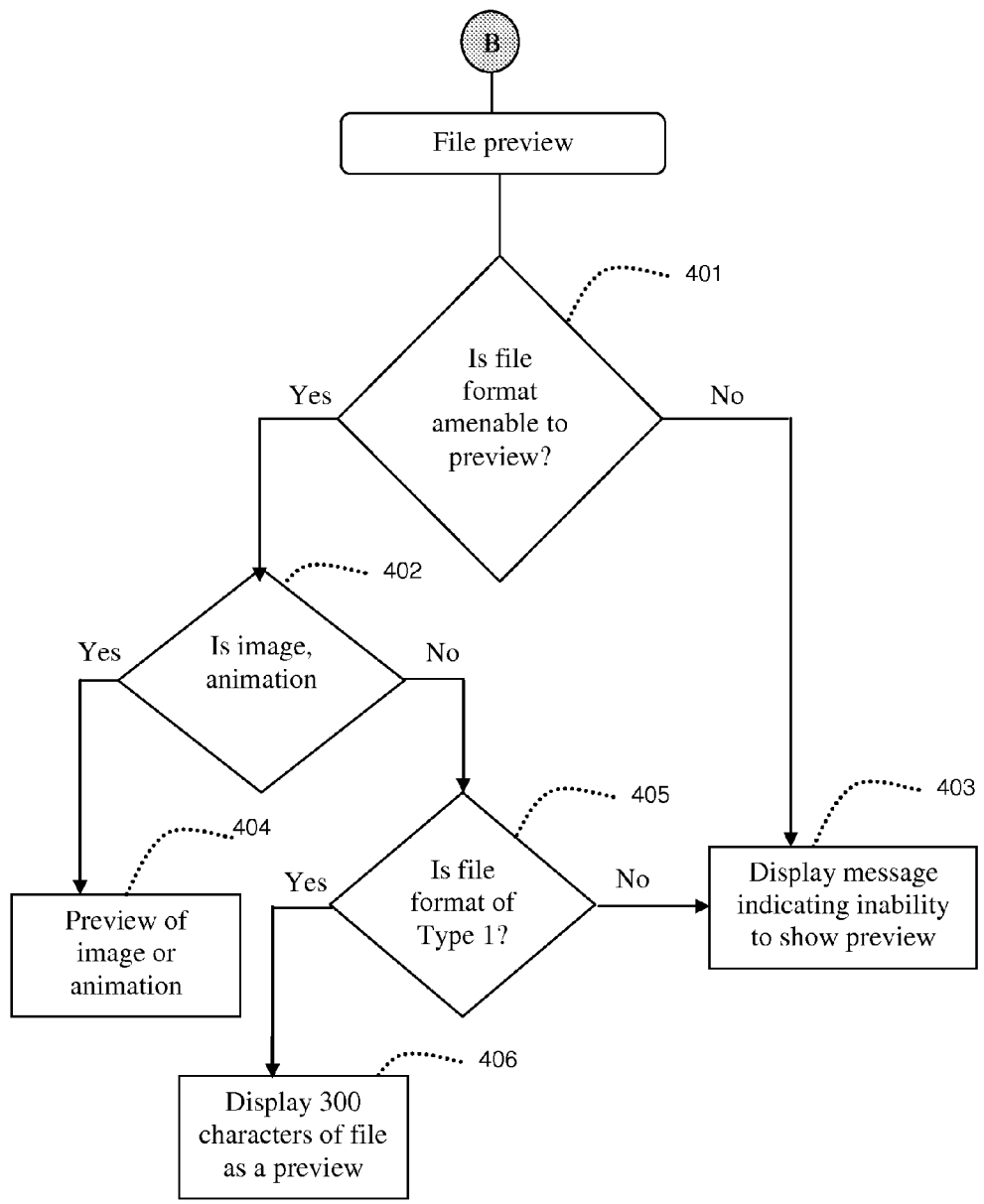
FIG. 4 shows how, the user is enabled to see previews of certain types of files.

As per one beneficial embodiment of the present invention and FIG. 4 it is described how, on getting the list of files or folders in the display, as a result of the process described in the previous paragraph, the user is enabled to see previews of certain types of files, for which the application checks 401 whether the file is of a certain format amenable to previewing; if it is not, it indicates 403 the inability to display a preview; if it is amenable, then it checks 402 whether the format is an image or animation, in which case, it displays 404 a preview of the image or the first slide/frame of the animation; otherwise, it checks 405 if the format is a text, PDF or other similar format; if it is, it displays 406 the first 300 characters of the contents of the file; if for any reason it cannot do so, it displays 403 a message indicating inability to display a preview.

Figure 5:
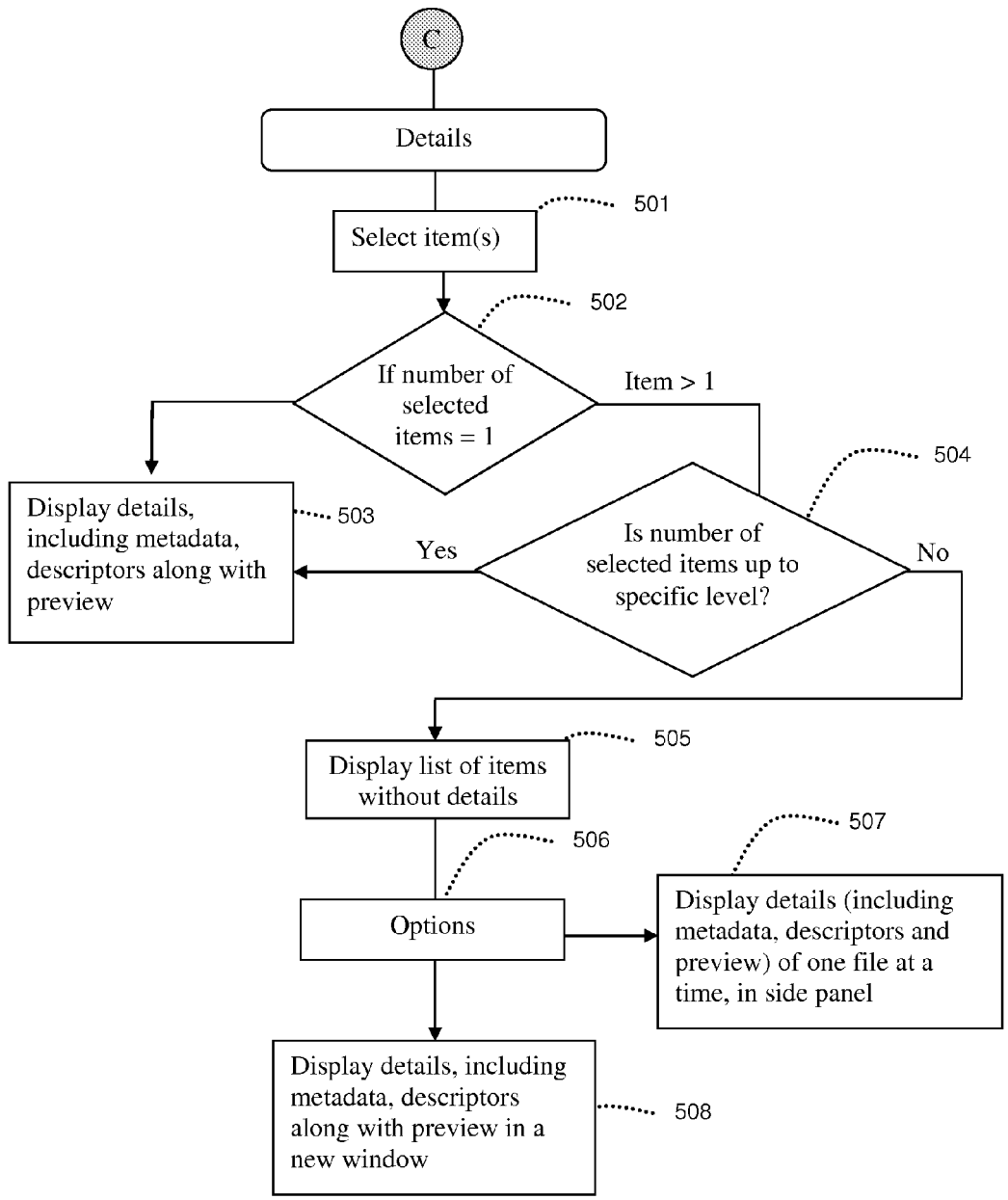
FIG. 5 indicates that the details of the selected items, including metadata and descriptors along with a preview of the files or folders in the side panel; if the number exceeds the limit, the application displays only the list of files and folders in the side panel 505, without metadata, descriptors or preview.

FIG. 5 indicates that when the user selects 501 one or more files or folders in the list of files or folders displayed, the details of that file or folder, including its meta data, such as file size, format, dates of creation and modification, etc. are displayed in a panel on the side, along with descriptor information added by the user, including bookmark, priority, group, labels and comments. The application checks 502 if the number of items selected is one or more than one; if it is one, it displays the details 503, including metadata and descriptors, along with a preview of the file. Alternatively, the application checks 504 if the number of items selected is up to a certain (preferably small) limit, and if it is, it displays 503 the details of the selected items, including metadata and descriptors along with a preview of the files or folders in the side panel; if the number exceeds the limit, the application displays only the list of files and folders in the side panel 505, without metadata, descriptors or preview. The user can then opt 506 to click on one of the items in the panel to expand its details in the side panel 507, or opt to see the details (including metadata, descriptors and previews) of all the selected files or folders in a new window 508.

Figure 6:
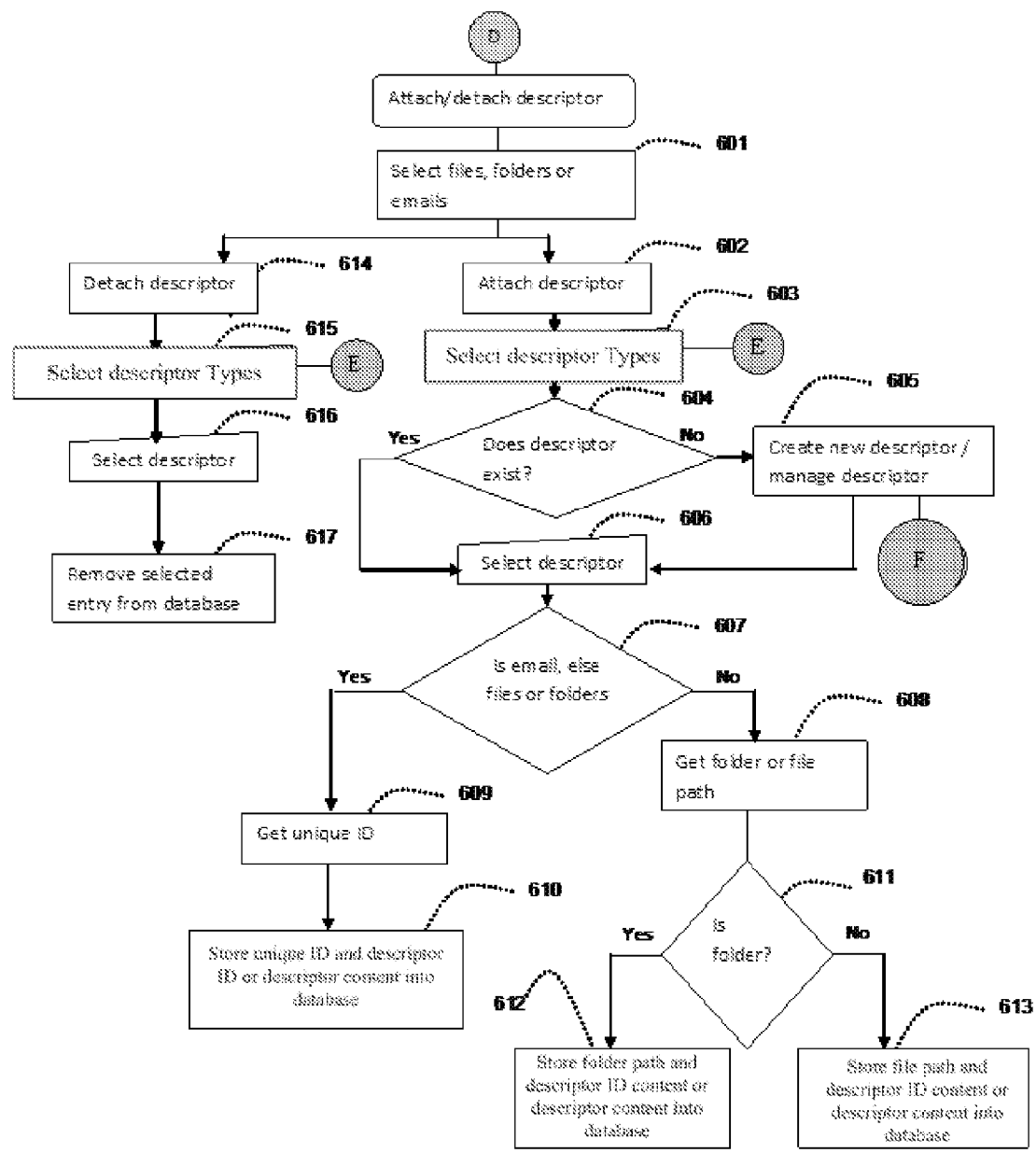
FIG. 6 explains the process of attaching/detaching descriptors to files, folders and/or emails.

FIG. 6 explains the process of attaching/detaching descriptors to files, folders and emails. It requires the user to select 601 one or more files, folders or emails displayed in the list acquired as described in the figures above, and then decide 602 to attach a descriptor by selecting a descriptor from a hierarchy of descriptors already created by the user or by a central administrator or imported by the user from another user; the user can select the type of descriptor 603 and further the user can check 604 if a desired descriptor does or does not exist in the available hierarchy of descriptors, and may create a new descriptor or import one through the method of managing descriptors 605 (FIG. 7) explained below in the method to manage descriptors of various types. When the user selects 606 a descriptor to "attach" it to the selected files, folders or emails, the application checks 607 whether the selection is an email or not; if it is an email, then it gets the unique ID 609 of the email and stores it 610 along with the unique ID and descriptor ID or descriptor content in the database; if the selection is a folder or file, it gets their paths 608, then checks 611 whether the selection is one or more folders or files, and then stores 612 & 613 the folder or file path and the descriptor ID or descriptor content in the database. Conversely, if the user chooses to detach 614 a descriptor from a selection of files, folders or emails, he selects 615 the descriptor type and the descriptor 616, and the application removes 617 the selected entries from the database.

Figure 7:
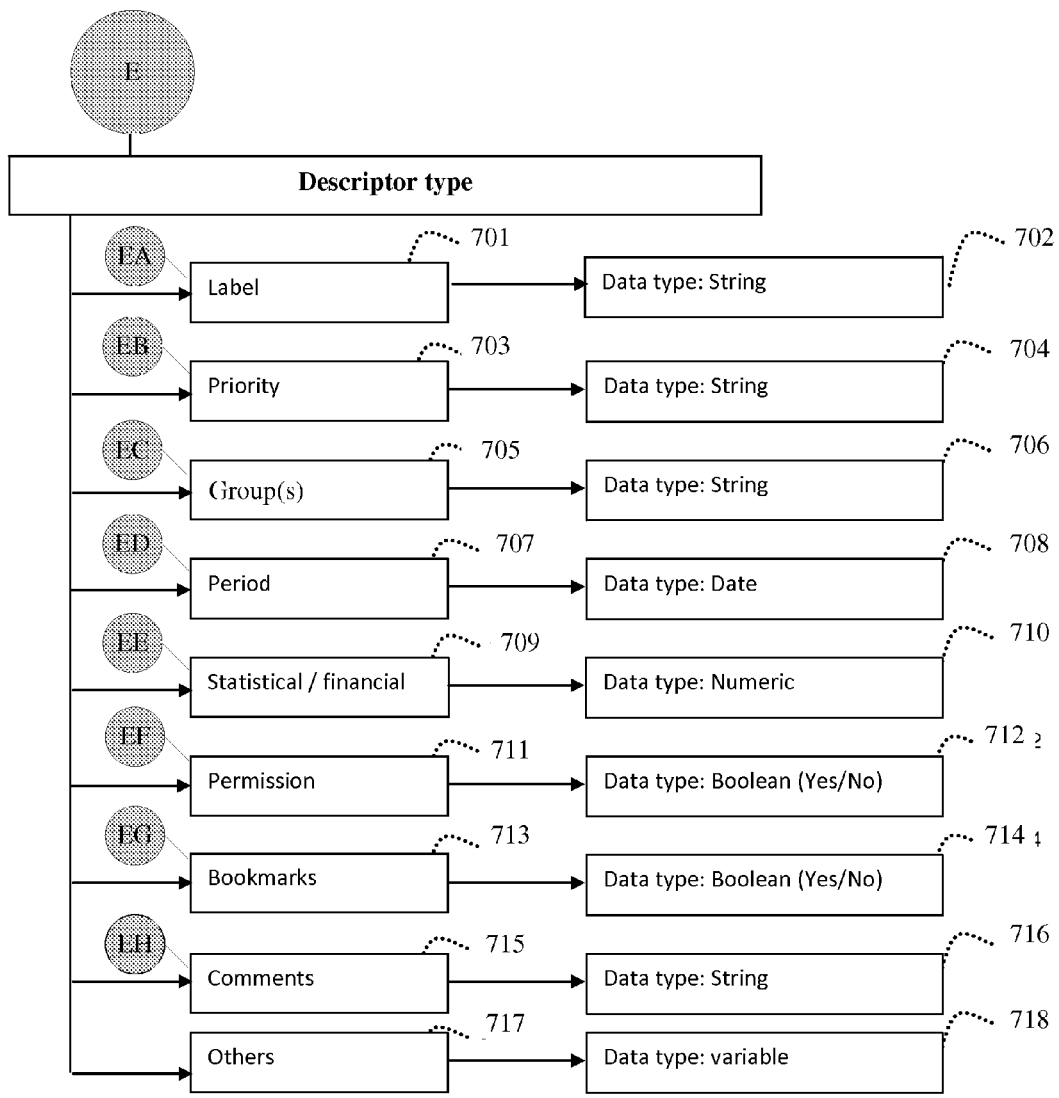
FIG. 7 explains the types of descriptors that are appended to files, folders and/or emails.

FIG. 7 describes the types of descriptors that can be employed for associating files, folders, messages or emails in the directory management and email management system. The descriptor types include labels 701 of data type string (702) (attaching/detaching is explained in FIG. 7A), priority 703 of data type string (704) (attaching/detaching is explained in FIG. 7B), grouping 705 of data type string (706) (attaching/detaching is explained in FIG. 7C), period/duration object 707 of data type Date (708) (attaching/detaching is explained in FIG. 7D), statistical/financial object 709 of data type Numeric (710) (attaching/detaching is explained in FIG. 7E), permission object 711 of data type Boolean (Yes/No) (712) (attaching/detaching is explained in FIG. 7F), bookmarks 713 of data type Boolean (Yes/No) (714) (attaching/detaching is explained in FIG. 7G), comments 715 of data type string (716) (attaching/detaching is explained in FIG. 7H) amongst other 717 of data type variable (718) descriptors that fall within the scope of this invention.

As mentioned descriptors are labels, bookmarks, comments, priorities, groupings, statistical and financial tags, periods, permissions and other types of organizational procedures, and others. These are examples of the diversity of descriptors that can be attached to content.

The data types include string/character, numeric, currency, Boolean, date, etc. stipulated in databases. These are examples of the diversity of data types that descriptors can use.

Descriptors with different data types can make it possible for users to extract content with greater accuracy by improving the relevance of retrieval lists. For example, when labels with numeric or currency data types are used that specify the value of the variable 'revenues' related to files on company financials, the user could retrieve content on all companies with revenues in a desired numeric range. Similarly, when labels with date data types are used that specify the period related to reports of any kind, the user could retrieve content related to a desired date range.

The types of descriptors as mentioned above and detailed below are not intended to limit the scope of this invention. It will be understood to a person skilled in the art that there can be additions made to descriptors from time to time which would fall within the scope of this invention.

Figure 7A:
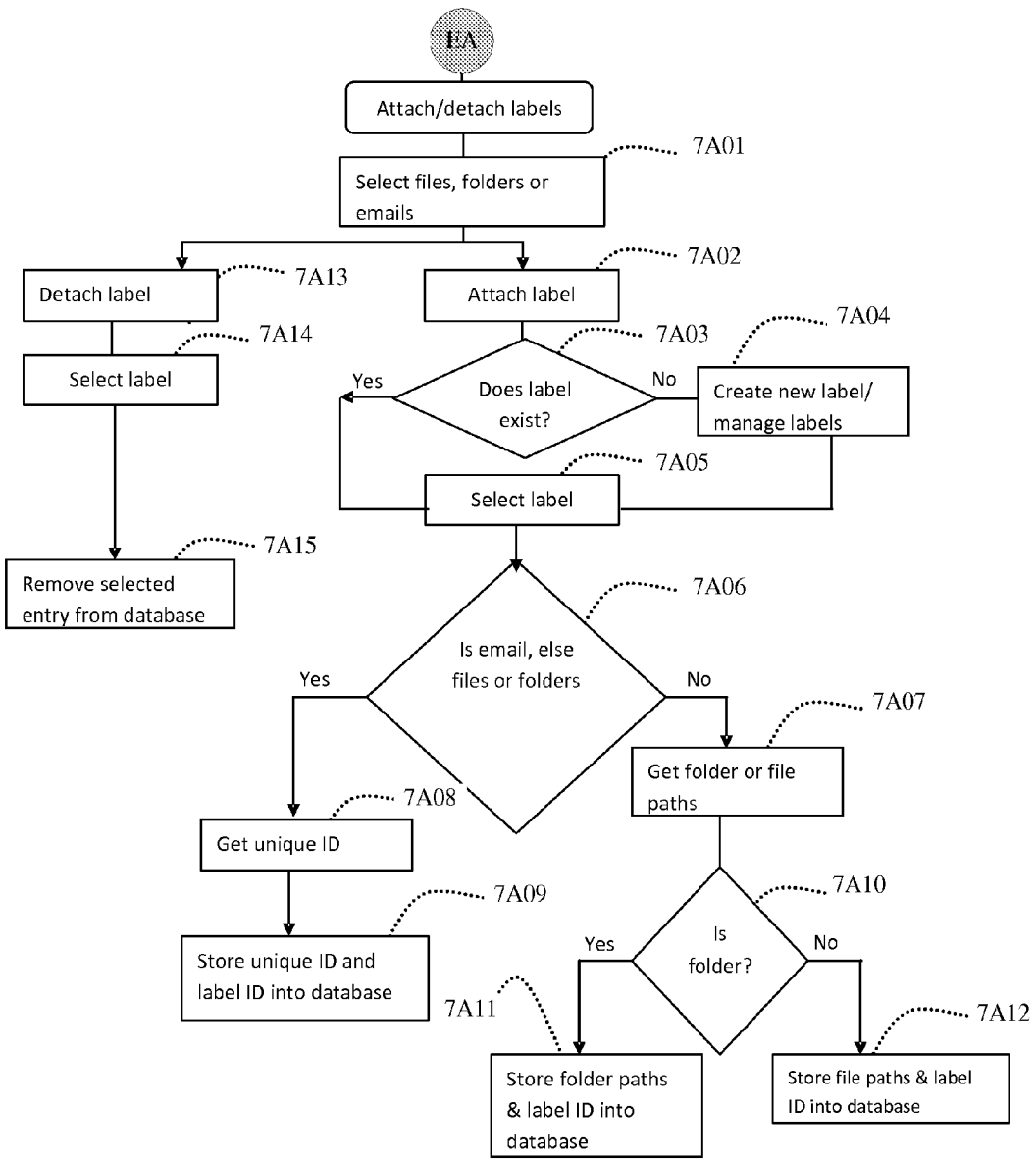
FIG. 7A explains the process of attaching/detaching labels to files, folders and/or emails.

FIG. 7A explains the process of attaching/detaching labels to files, folders and emails. It requires the user to select 7A01 one or more files, folders or emails displayed in the list acquired as described in the figures above, and then decide 7A02 to attach a label by selecting a label from a hierarchy of labels already created by the user or by a central administrator or imported by the user from another user; the user can check 7A03 if a desired label does or does not exist in the available hierarchy of labels, and may create a new label or import one through the method of managing labels 7A04 explained below in the method to manage descriptors of various types. When the user selects 7A05 a label to "attach" it to the selected files, folders or emails, the application checks 7A06 whether the selection is an email or not; if it is an email, then it gets the unique ID 7A08 of the email and stores unique ID and label ID 7A09 in the database; if the selection is a folder or file, it gets their paths 7A07, then checks 7A10 whether the selection is one or more folders or files, and then stores 7A11 folder paths and label ID in the database if folder is selected & 7A12 file path and label ID is stored in the database if file is selected. Conversely, if the user chooses to detach 7A13 label from a selection of files, folders or emails, he selects the label 7A14, and the application removes 7A15 the selected entries from the database.

Figure 7B:
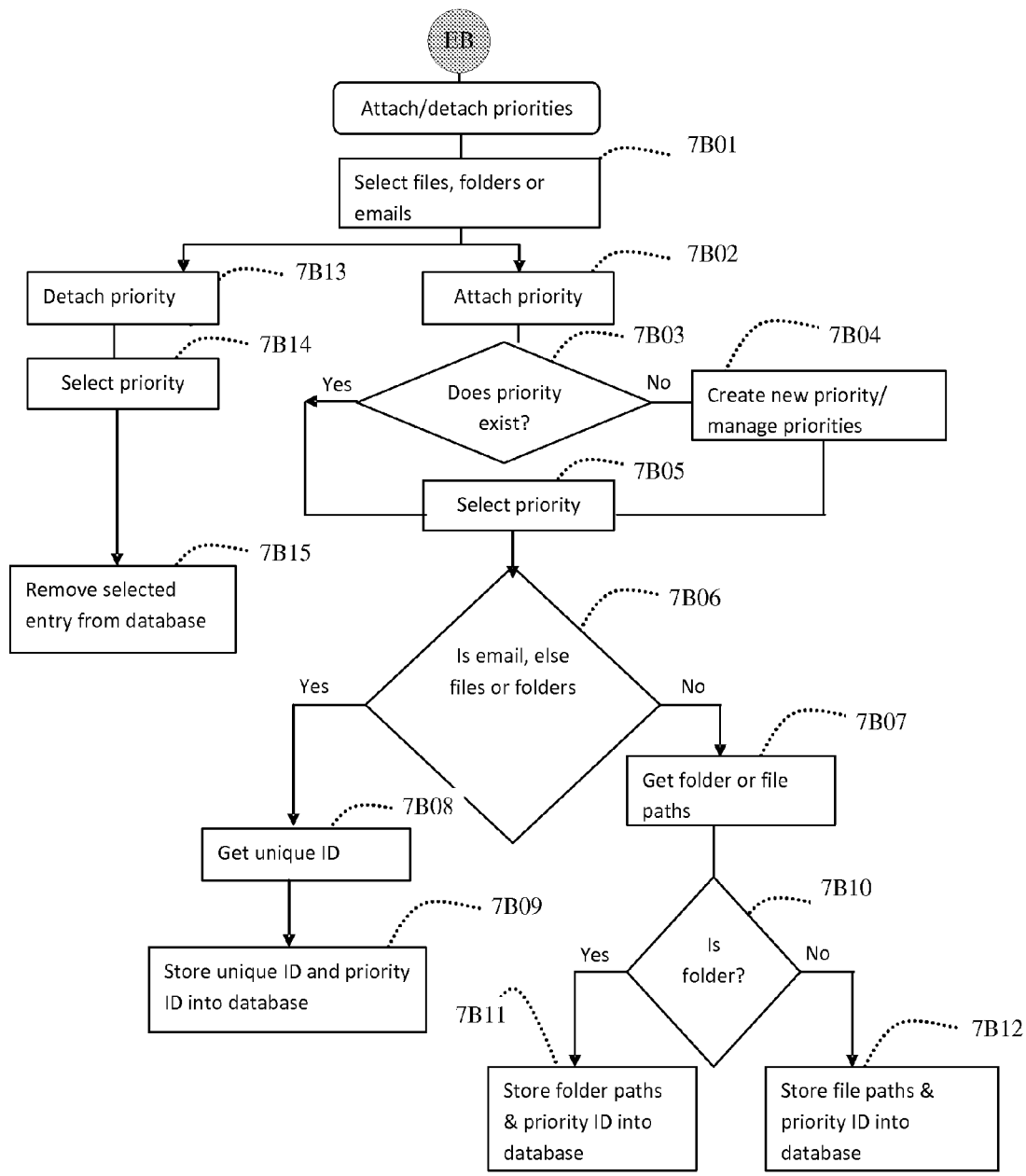
FIG. 7B explains the process of attaching/detaching priorities to files, folders and emails.

FIG. 7B explains the process of attaching/detaching priorities to files, folders and emails. Priorities are means of specifying the urgency, order or level of importance of files, folders or emails, and could be displayed as numbers or colors or by textual description; in an organization, there could be centrally- or departmentally-determined priorities and individual user-determined priorities. The process requires the user to select 7B01 one or more files, folders or emails displayed in the list acquired as described in the figures above, and then opt to attach 7B02 a priority by selecting a priority tag from a list of priorities already created by the user or by a central or departmental administrator or imported by the user from another user; if the user wishes 7B03 to attach a priority that does not exist in the available list of priorities, then he may create a new priority or import one through the method of managing priorities 7804 (explained below in the method to manage descriptors of various types in FIGS. 22 and 23).

When the user selects 7B05 a priority to "attach" it to the selected files, folders or emails, the application checks 7B06 whether the selection is an email or not; if it is an email, then it gets the unique ID 7B08 of the email and stores it 7B09 along with the priority ID in the database; if the selection is one or more folders or files, it gets their paths 7B07, then checks 7B10 whether the selection is a folder or file, and then if it is folder, stores 7B 11 folder path and priority ID in the database else if it is a file then stores 7B12 file paths and the priority ID in the database. Conversely, if the user chooses to detach 7B13 a priority from a selection of files, folders or emails, he selects 7B14 the relevant priority tag, and the application 7B15 removes the selected entries from the database.

Figure 7C:
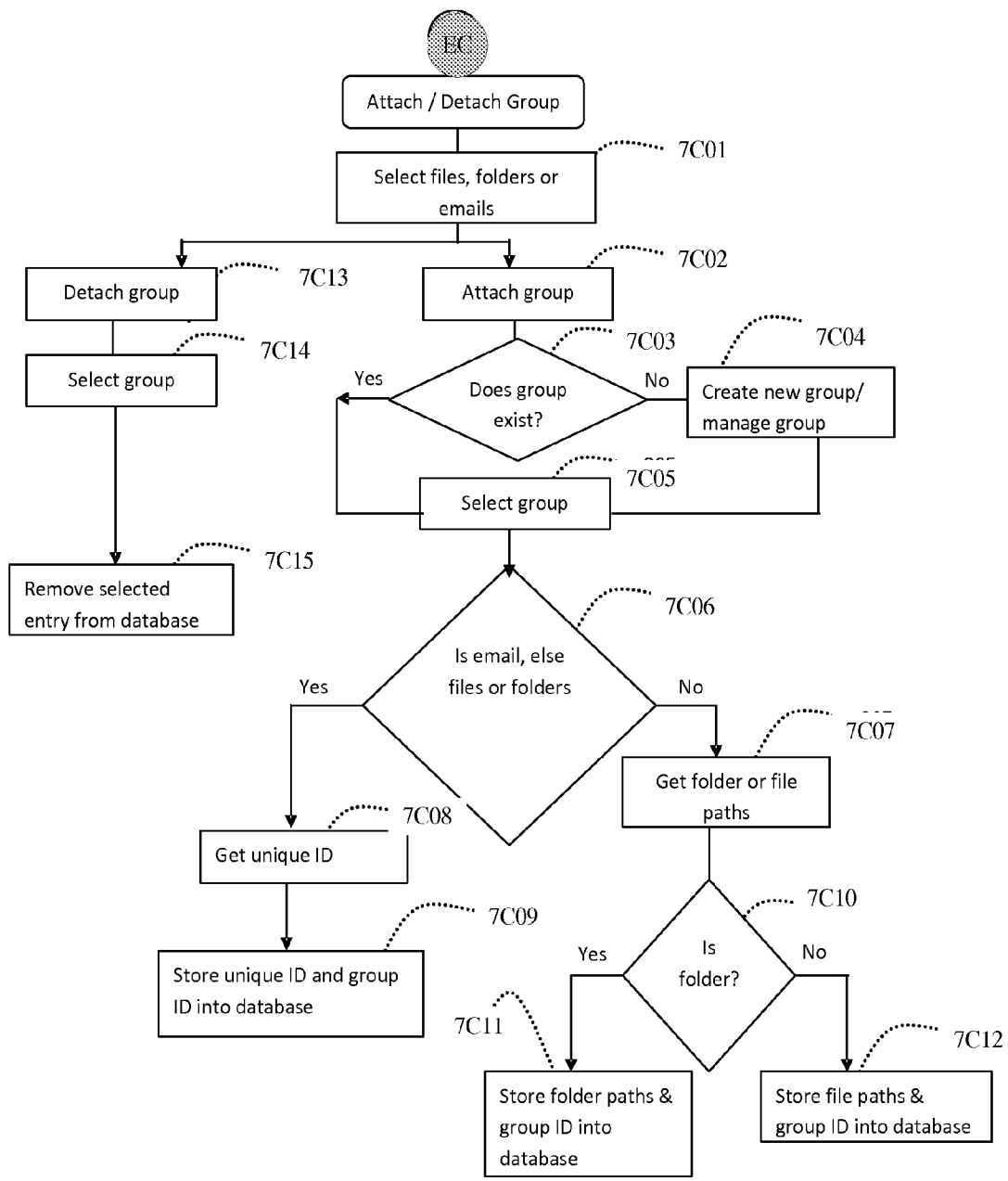
FIG. 7C explains the process of attaching/detaching groups to files, folders and emails.

FIG. 7C explains the process of attaching/detaching groups to files, folders and emails. The group descriptor names the group (e.g., conglomerate holding group that controls several companies; finance, marketing or logistics departments or informal groups, such as employees interested in community welfare or sports activities) in the organization for whom the file or folder would be of interest. It requires the user to select 7C01 one or more files, folders or emails displayed in the list acquired as described in the figures above, and then opt to attach 7C02 a group by selecting a group tag from a hierarchy of groups already created by the user or by a central administrator or imported by the user from another user; the user can check 7C03 a desired group does or does not exist in the available hierarchy of groups, then he may create a new group or import one through the method of managing group 7C04 explained below in the method to manage descriptors of various types (explained below in the method to manage descriptors of various types in FIGS. 22 and 23).

When the user selects 7C05 a group to "attach" it to the selected files, folders or emails, the application checks 7C06 whether the selection is an email or not; if it is an email, then it gets the unique ID 7C08 of the email and stores it 7C09 along with the group ID in the database; if the selection is one or more folders or files, it gets their paths 7C07, then checks 7C10 whether the selection is a folder or file, and then stores folder paths and group ID into database 7C11 & 7C12 store file path and the group ID in the database. Conversely, if the user chooses the detach 7C13 a group from a selection of files, folders or emails, he selects 7C14 the relevant group tag, and the application removes 7C15 the selected entries from the database.

Figure 7D:
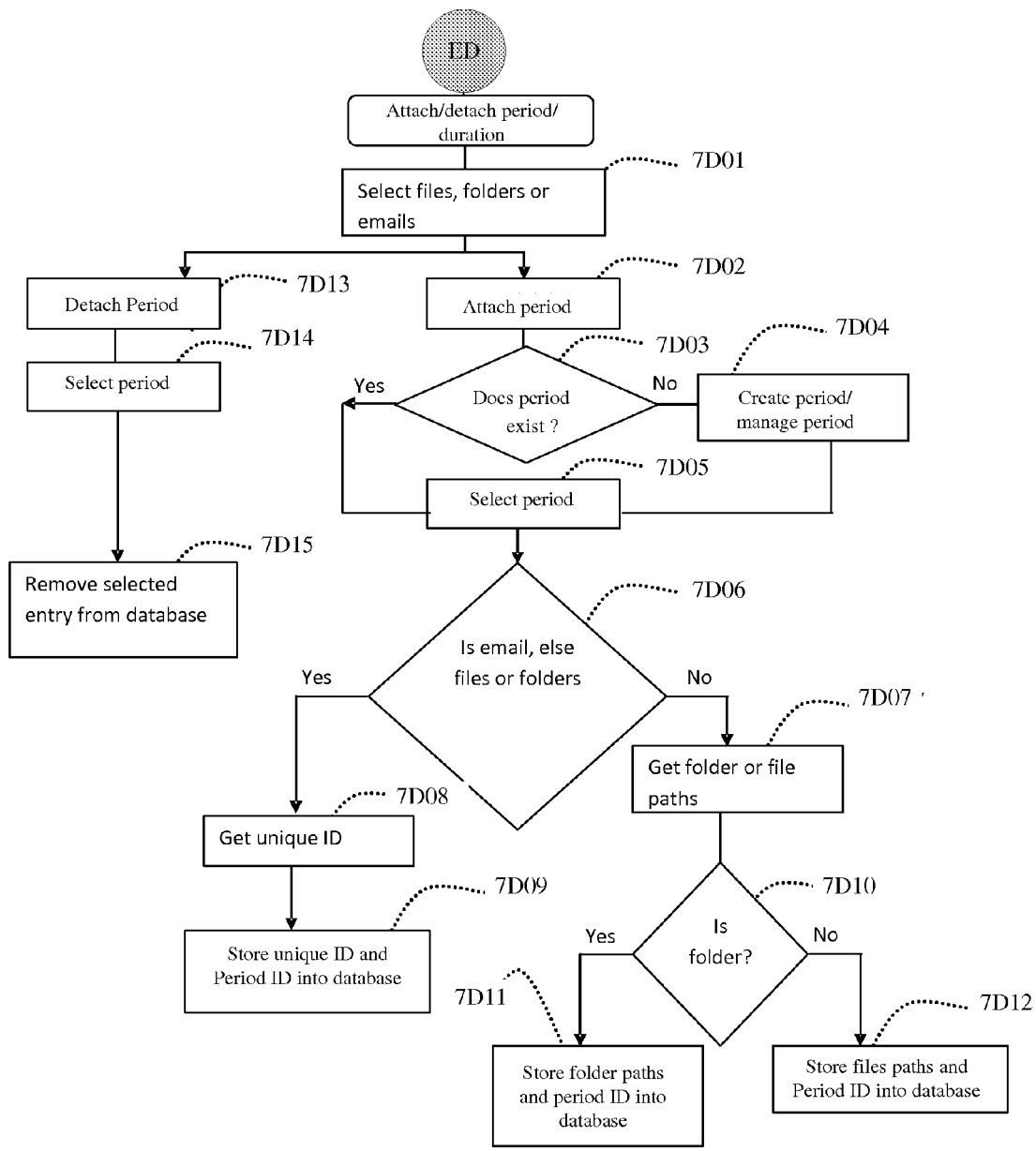
FIG. 7D explains the process of attaching/detaching period/duration to files, folders and emails.

FIG. 7D explains the process of attaching/detaching period/duration as a descriptor to files, folders and emails. It requires the user to select 7D01 one or more files, folders or emails displayed in the list acquired as described in the figures above, and then decide 7D02 to attach a period object descriptor by selecting a period descriptor from a hierarchy of period descriptors already created by the user or by a central administrator or imported by the user from another user; the user can check 7D03 if a desired period does or does not exist in the available hierarchy of periods, and may create a new period or import one through the method of managing periods 7D04 explained below in the method to manage descriptors of various types. When the user selects period 7D05, the application checks 7D06 whether the selection is an email or not; if it is an email, then it gets the unique ID 7D08 of the email and stores unique ID and period ID 7D09 in the database; if the selection is a folder or file, it gets their paths 7D07, then checks 7D10 whether the selection is one or more folders or files, and if the selection is one or more folders then stores 7D11 folder path and period ID into database & if selection is not folder then 7D12 stores file paths and period ID the folder or in the database. Conversely, if the user chooses to detach 7D13 Period from a selection of files, folders or emails, he selects the period 7D14, and the application removes 7D15 the selected entries from the database.

Figure 7E:
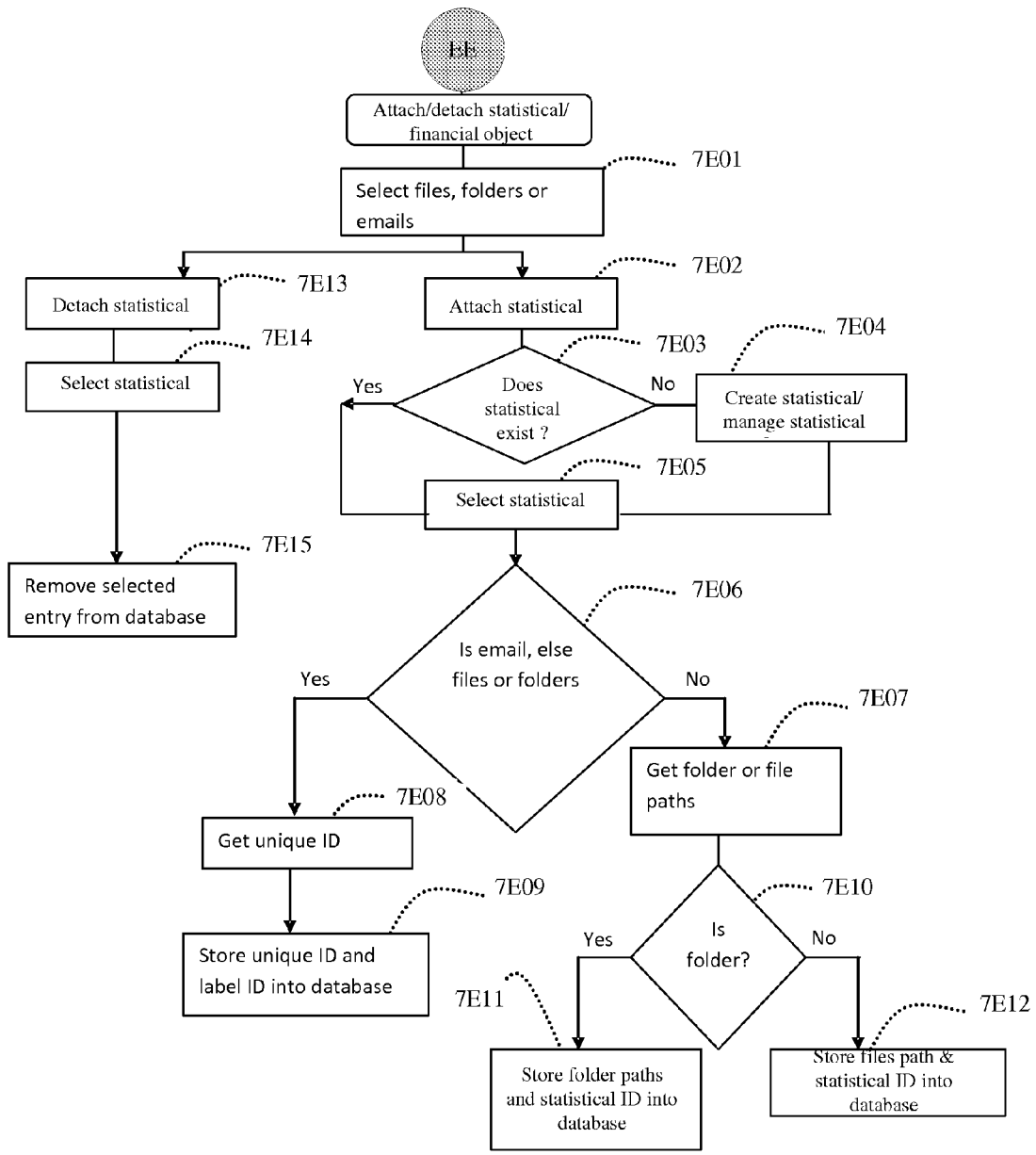
FIG. 7E explains the process of attaching/detaching statistical/financial object to files, folders and emails.

FIG. 7E explains the process of attaching/detaching statistical/financial object as a descriptor to files, folders and emails. It requires the user to select 7E01 one or more files, folders or emails displayed in the list acquired as described in the figures above, and then decide 7E02 to attach a statistical/financial object descriptor by selecting a statistical/financial descriptor from a hierarchy of statistical/financial descriptors already created by the user or by a central administrator or imported by the user from another user; the user can check 7E03 if a desired statistical object does or does not exist in the available hierarchy of statistical/financial descriptors, and may create a new statistical/financial descriptor or import one through the method of managing statistical descriptor 7E04 explained below in the method to manage descriptors of various types. When the user selects 7E05 statistical, the application checks 7E06 whether the selection is an email or not; if it is an email, then it gets the unique ID 7E08 of the email and stores 7E09 unique ID and statistical/financial ID in the database; if the selection is a folder or file, it gets their paths 7E07, then checks 7E10 whether the selection is one or more folders or files, and then stores 7E11 folder paths and statistical ID if folder is selected and if folder is not selected then stores 7E12 file paths and statistical/financial ID in the database. Conversely, if the user chooses to detach 7E13 statistical from a selection of files, folders or emails, he selects the period 7E14, and the application removes 7E15 the selected entries from the database.

Figure 7F:
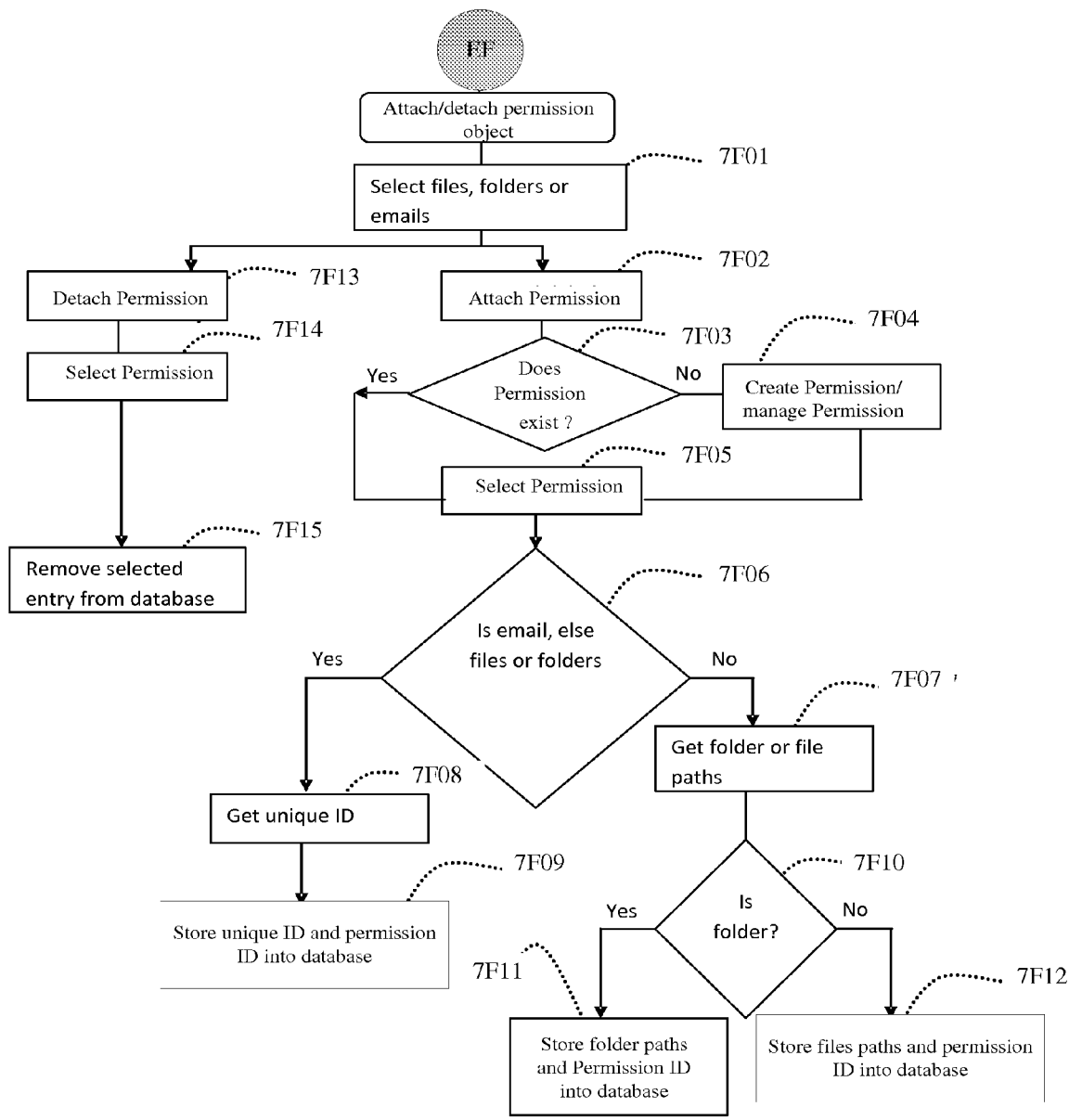
FIG. 7F explains the process of attaching/detaching permission to files, folders and emails.

FIG. 7F explains the process of attaching/detaching permission object as a descriptor to files, folders and emails. It requires the user to select 7F01 one or more files, folders or emails displayed in the list acquired as described in the figures above, and then decide 7F02 to attach a permission object descriptor by selecting a permission descriptor from a hierarchy of permission descriptors already created by the user or by a central administrator or imported by the user from another user; the user can check 7F03 if a desired permission descriptor does or does not exist in the available hierarchy of permission, and may create a new period or import one through the method of managing permission 7F04 explained below in the method to manage descriptors of various types. When the user selects 7F05 Permission, the application checks 7F06 whether the selection is an email or not; if it is an email, then it gets the unique ID 7F08 of the email and stores it 7F09 along with permission ID in the database; if the selection is a folder or file, it gets their paths 7F07, then checks 7F10 whether the selection is one or more folders or files, and then stores 7F11 folder paths and permission ID in the database if folder is selected & 7F12 stores files paths and permission ID in the database if file is selected in the database. Conversely, if the user chooses to detach 7F13 permission from a selection of files, folders or emails, he selects the permission 7F14, and the application removes 7F15 the selected entries from the database.

Figure 7G:
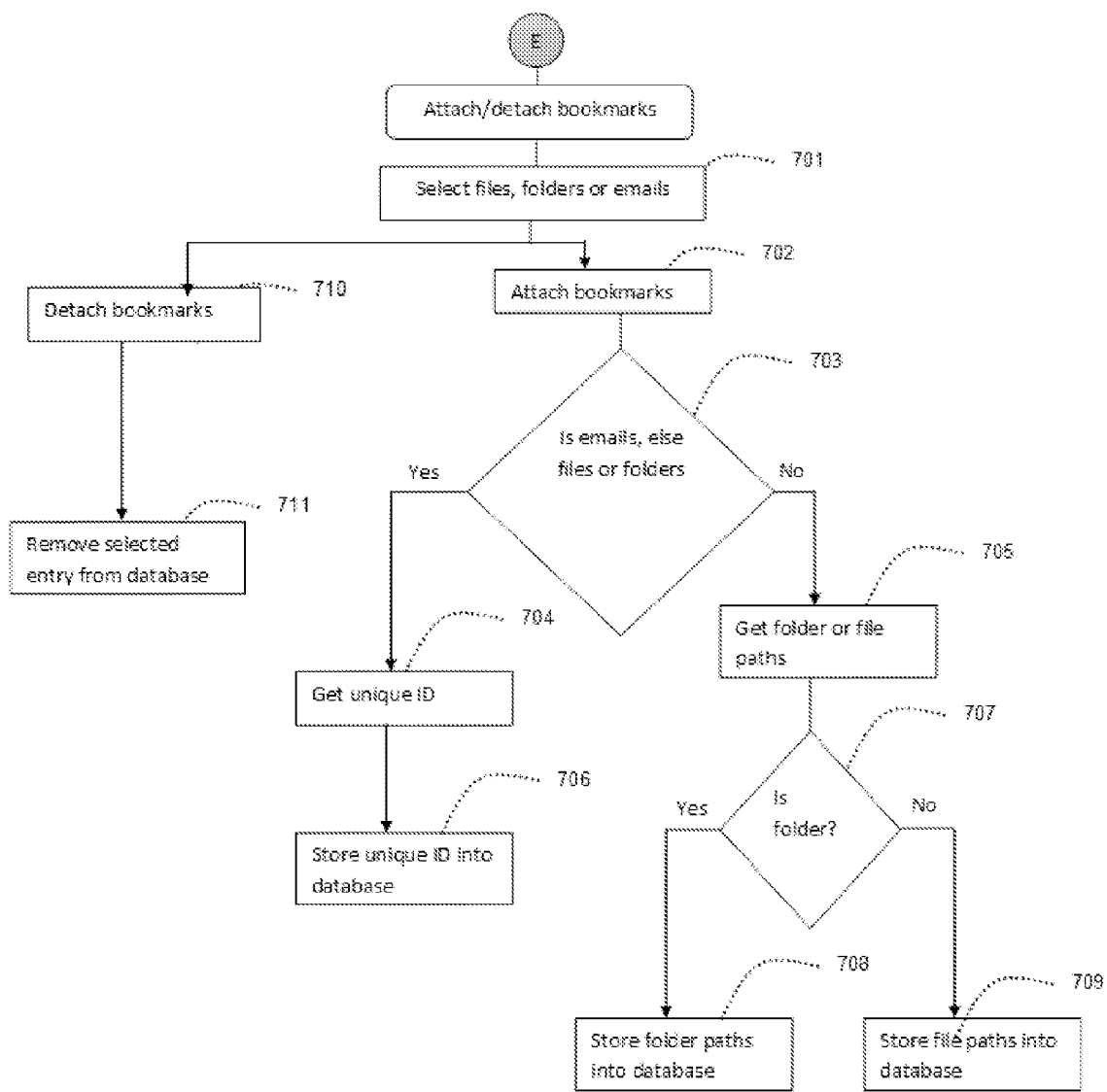
FIG. 7G explains the process of attaching/detaching bookmarks to files, folders and emails.

FIG. 7G explains the process of attaching/detaching bookmarks to files, folders and emails. It requires the user to select 7G01 one or more files, folders or emails displayed in the list acquired as described in the figures above, and then opt to bookmark it 7G02; then the application checks 7G03 whether the selection is an email or not; if it is an email, then it gets the unique ID 7G04 of the email and stores it 7G06 in the database; if the selection is one or more folders or files, it gets their paths 7G05, then checks 7G07 whether the selection is a folder or file, and then stores 7G08 folder paths in the database if folder is selected & stores 7G09 file paths in the database if file is selected. Conversely, if the user chooses to detach (bookmarks) 7G10 a selection of files, folders or emails, the application removes 7G11 the selected entries from the database.

Figure 7H:
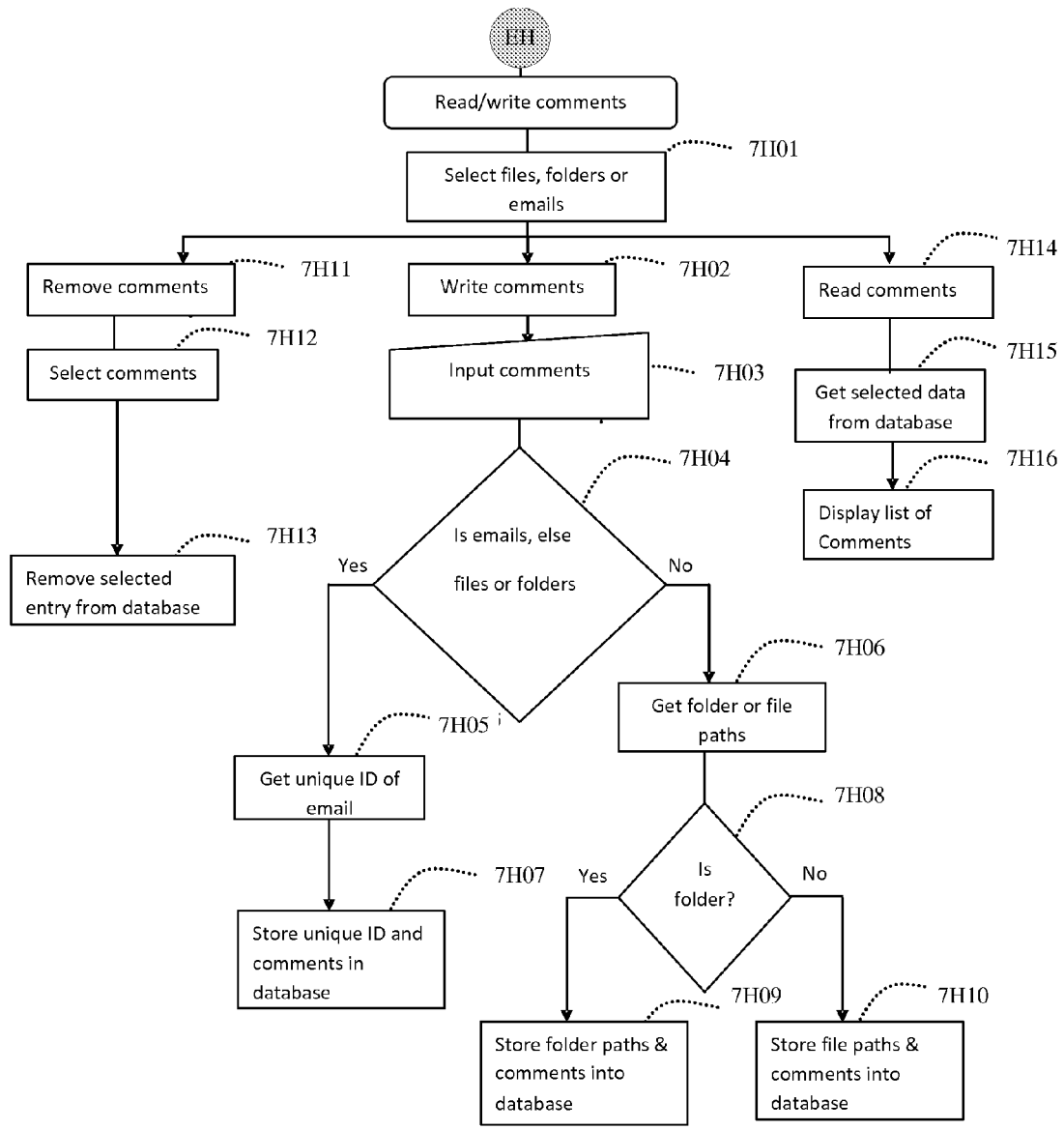
FIG. 7H explains the process of attaching/detaching comments to files, folders and emails.

FIG. 7H explains the process of writing, reading and deleting comments to files, folders and emails. It requires the user to select 7H01 one or more files, folders or emails displayed in the list acquired as described in the figures above, and then writing 7H02 a comment in a space provided by the application, which then inputs 7H03 the comment data in a table, checks 7H04 whether the selection is emails or folders and/or files; if it is an email, then it gets 7H05 the unique ID of the email and stores 7H07 the unique ID and the comment in the database; if it is folders or files, then it gets 7H06 the folder or file paths, and, after checking 7H08 whether it is folders or files, stores the folder or file paths, stores 7H09 folder paths and comments into database when folder is selected & stores 7H10 file paths and comments in the database. If the user wishes to delete a comment 7H11, he selects 7H12 the comment, and the application removes 7H13 the comment from the database or disables the display of the comment. If the user wishes to read 7H14 a comment, he selects 7H01 the folder, file or email from the displayed list and the application gets 7H15 the comment from the database, and displays 7H16 the comment for the user to see.

Figure 8:
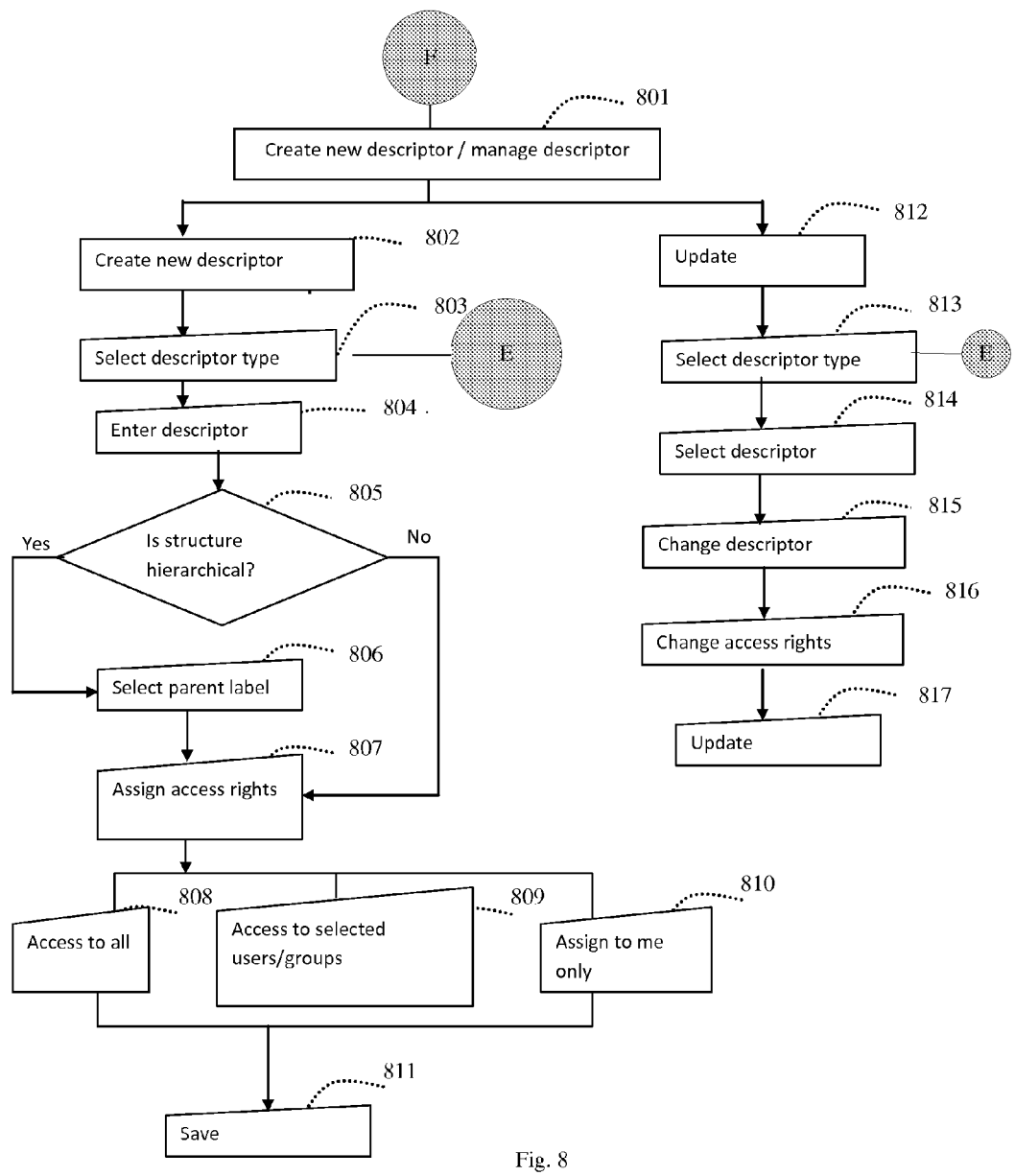
FIG. 8 explains the process of creating and managing descriptors for files, folders and/or emails.

FIG. 8 explains the process of creating and/or managing 801 descriptors. 802 initiates the process of creating new descriptor, 803 selects the type of descriptor to be appended and once selected the descriptor is entered 804. The structure hierarchy is determined by 805 where, if the hierarchy is existing then a parent descriptor is selected 806 else directly the assigning of access rights is initiated 807. The access right is categorized into: access for all 808, access to selected users/groups 809 and assign rights for the user only 810 and then the descriptor is saved 811 with access rights. 812 initiates any updating process required for already existing appended descriptor data object. 813 selects the descriptor type and 814 selects the descriptor to be edited. 815 changes the descriptor whereas the access rights are changed by 816 after which the update is saved 817.

FIG. 9 explains the process of saving 901 the selected files, folders and or email in the database as binary objects. 902 select files from a list or windows explorer. 903 select the descriptors. 904 converts the files to binary form. 905 checks the condition if the descriptor was selected or not, if yes then the file is stored in database along with the descriptor 906, else the object is saved in the database 907. The process of converting a file to binary and saving it in the database is executed to provide controlled access by assigning limited users the right to open or use an object.

Figure 10:
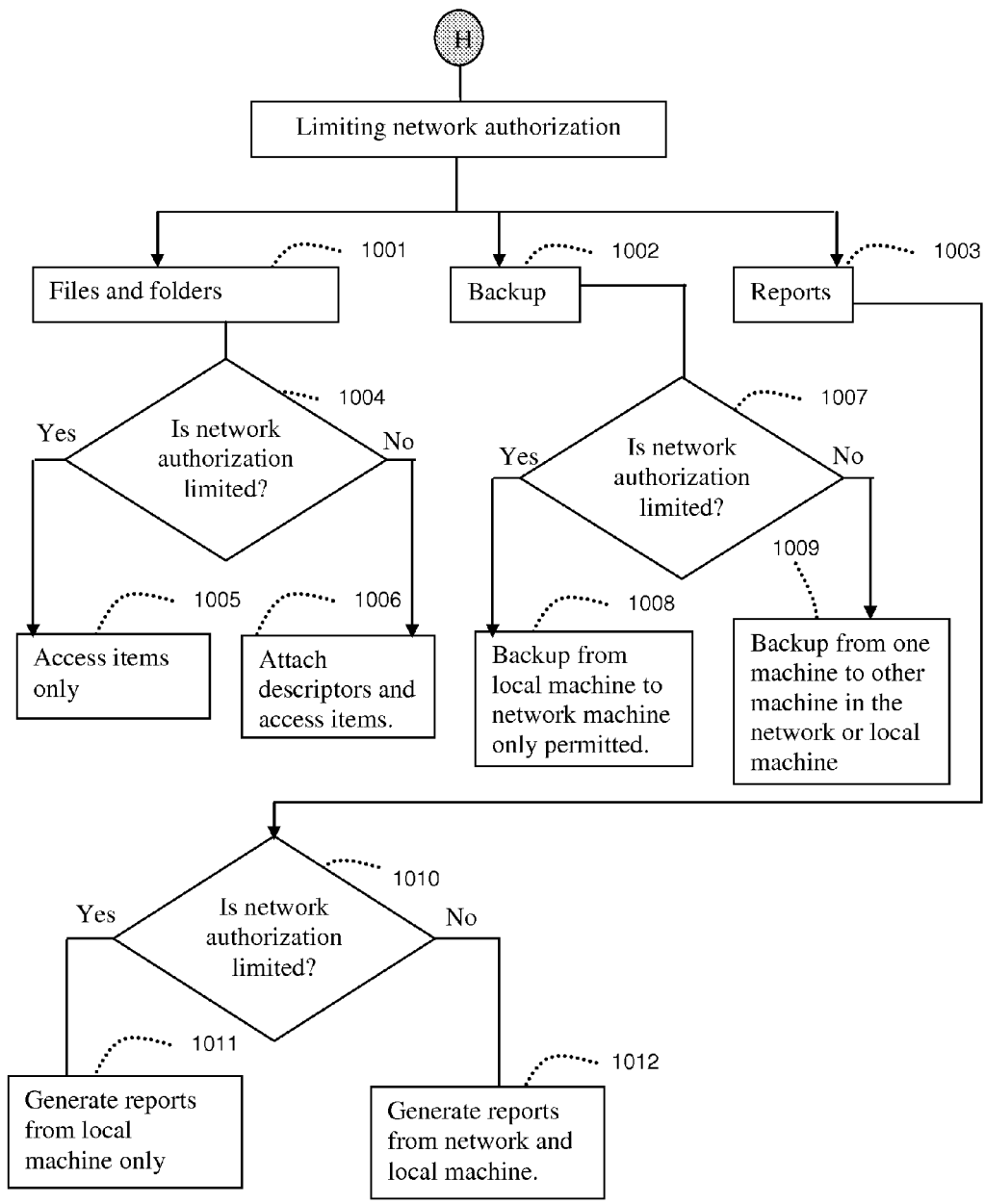
FIG. 10 explains the option of "limiting the network authorization of the application" to the machines on which it is installed so that the user organization can retain control of how the application is used within its local network FIG. 11 explains the process of finding duplicates.

FIG. 10 explains the option of "limiting the network authorization of the application" to the machines on which it is installed so that the user organization can retain control of how the application is used within its local network. The authorization limitation method works in such a way that, for example, in managing files and folders 1001, the application checks 1004 whether it has limited network authorization; if it is limited, then the user can only access files and folders on machines other than his own but not attach descriptors to them 1005; if it is not, he can attach descriptors to files and folders on other machines 1006 which the application is authorized to include.

Similarly, for the purpose of backup 1002, the application checks 1007 whether it has limited network authorization; if it is limited, then the user can back up from his local machine to network machines but cannot back up files or folders residing in other machines 1008; if it is not, he can back up files or folders residing in other machines 1009.

Similarly, for the purpose of generating reports 1003, the application checks 1010 whether it has limited network authorization; if it is limited, then the user can generate reports only from his local machine and not from other machines 1011, if it is not, he can generate reports related to files or folders residing in other machines 1012.

Figure 11:
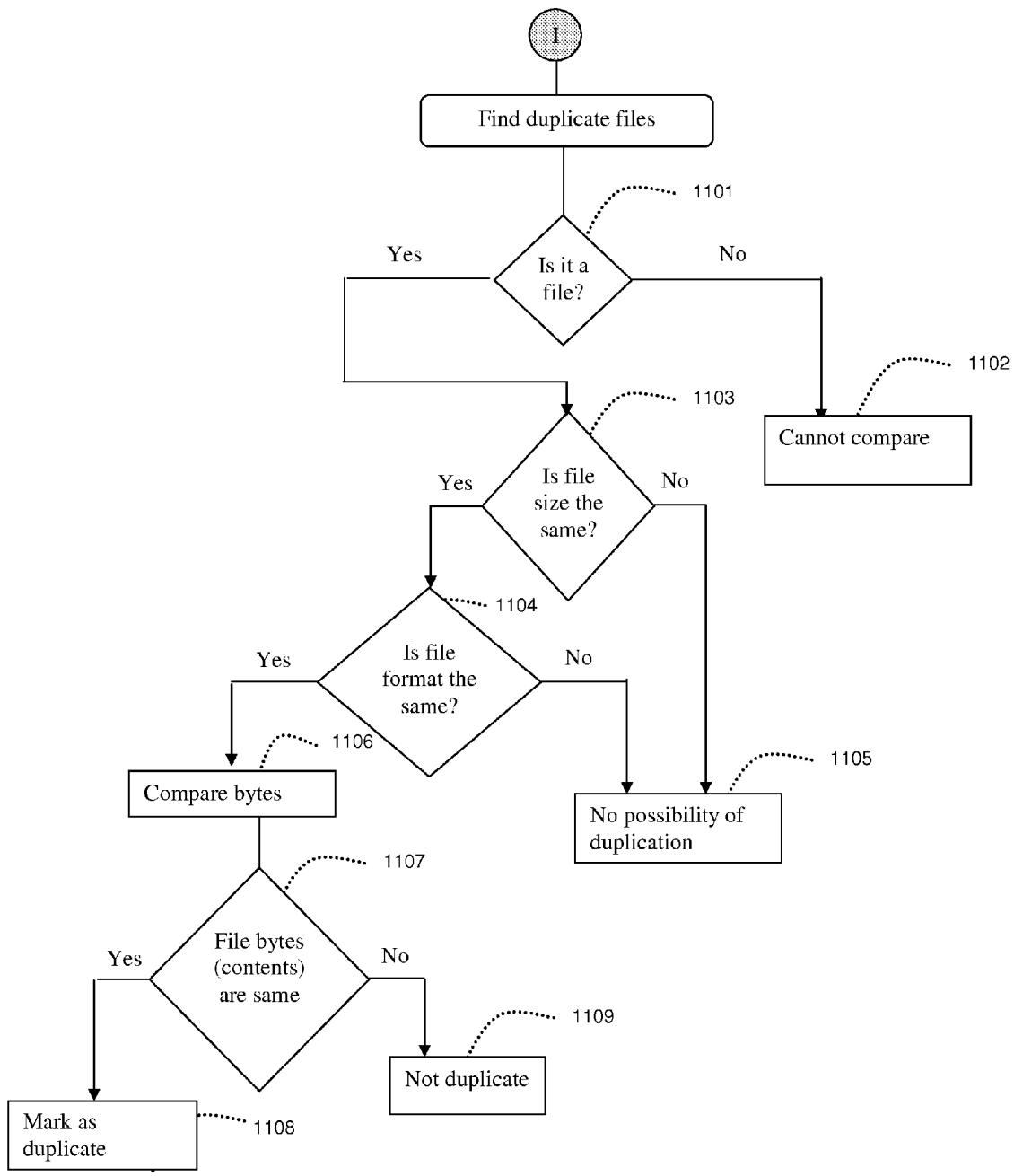

FIG. 11 explains the process of finding duplicates. 1101 checks if the listed item is a file, if yes, it checks file size 1103. If not (that is, for example, if it is a folder) it does not do any comparison 1102. If the file sizes are the same, it checks if the formats too are the same 1104. If the formats are the same, then it compares the bytes (contents) in the similar-sized and similar-format files 1106. If the file bytes (contents of the files) are the same 1107, it marks them as duplicates 1108 or else 'not duplicate' 1109 is displayed. If the file formats are not the same 1104 or size not same 1103, there is no possibility of duplication 1105.

Figure 12:
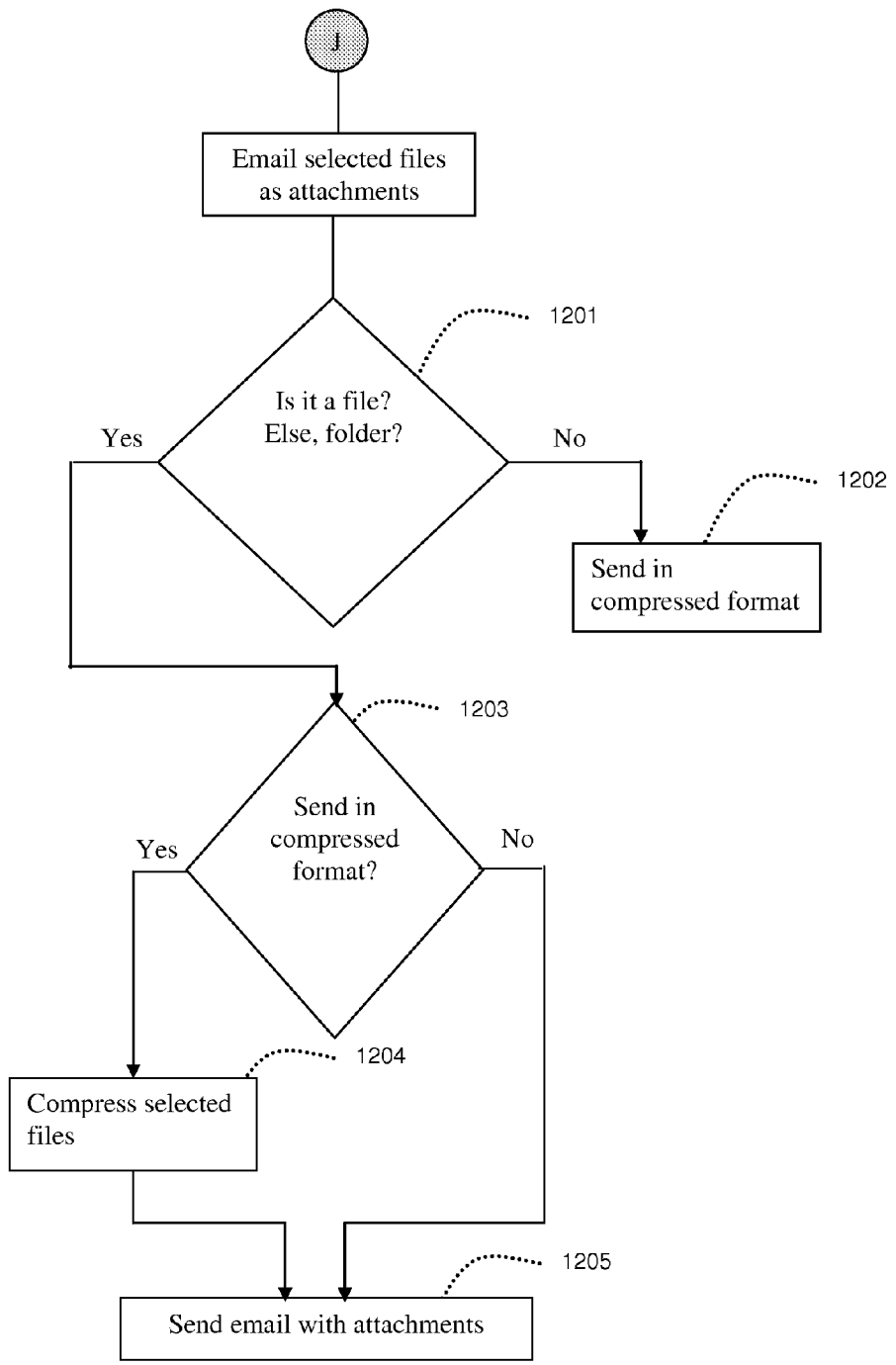
FIG. 12 illustrates the process of e-mailing selected files or folders as attachments.

FIG. 12 illustrates the process of e-mailing selected files or folders as attachments. The process checks 1201 whether the selection is file or folder. If it is not a file, i.e., it is a folder; the application sends it in a compressed (e.g. 'zip') format 1202. Alternatively, if it is a file, the user has the option 1203 to compress 1204 or not to compress the selection before e-mailing it 1205 with or without compressing.

Figure 13:
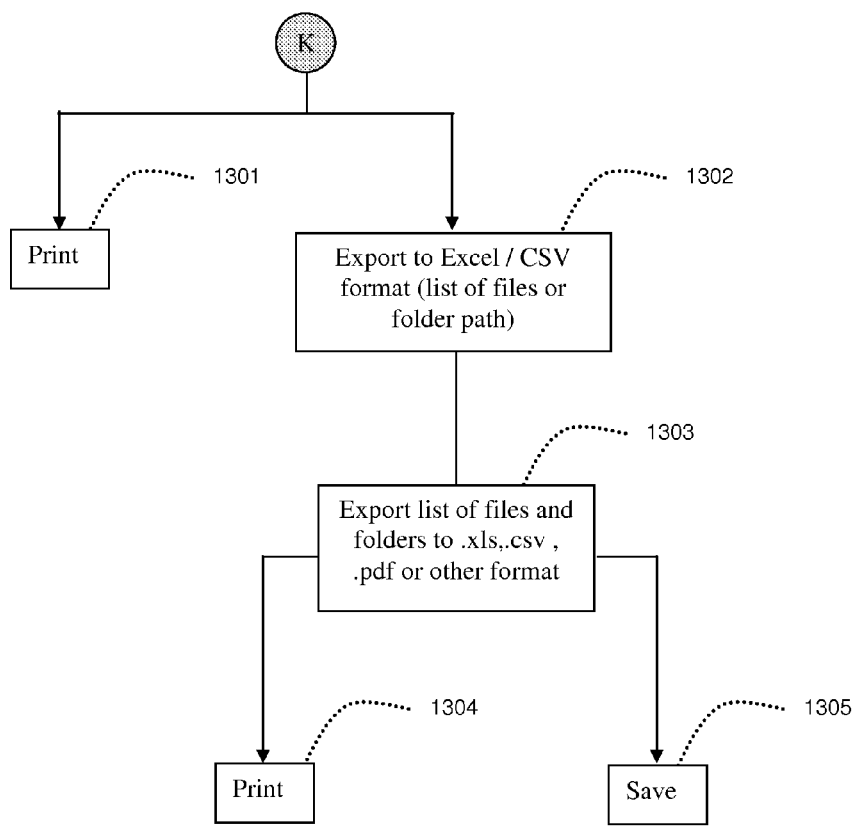
FIG. 13 explains the process of printing data directly or in Excel/CSV format.

FIG. 13 explains the process of printing data directly or in Excel/CSV format. 1301 allows the user to print directly in the displayed format; 1302 allows the user to export it in Excel/CSV format (including list of files and folder path) 1303, and print 1304 or save 1305 in the selected format.

Figure 14:
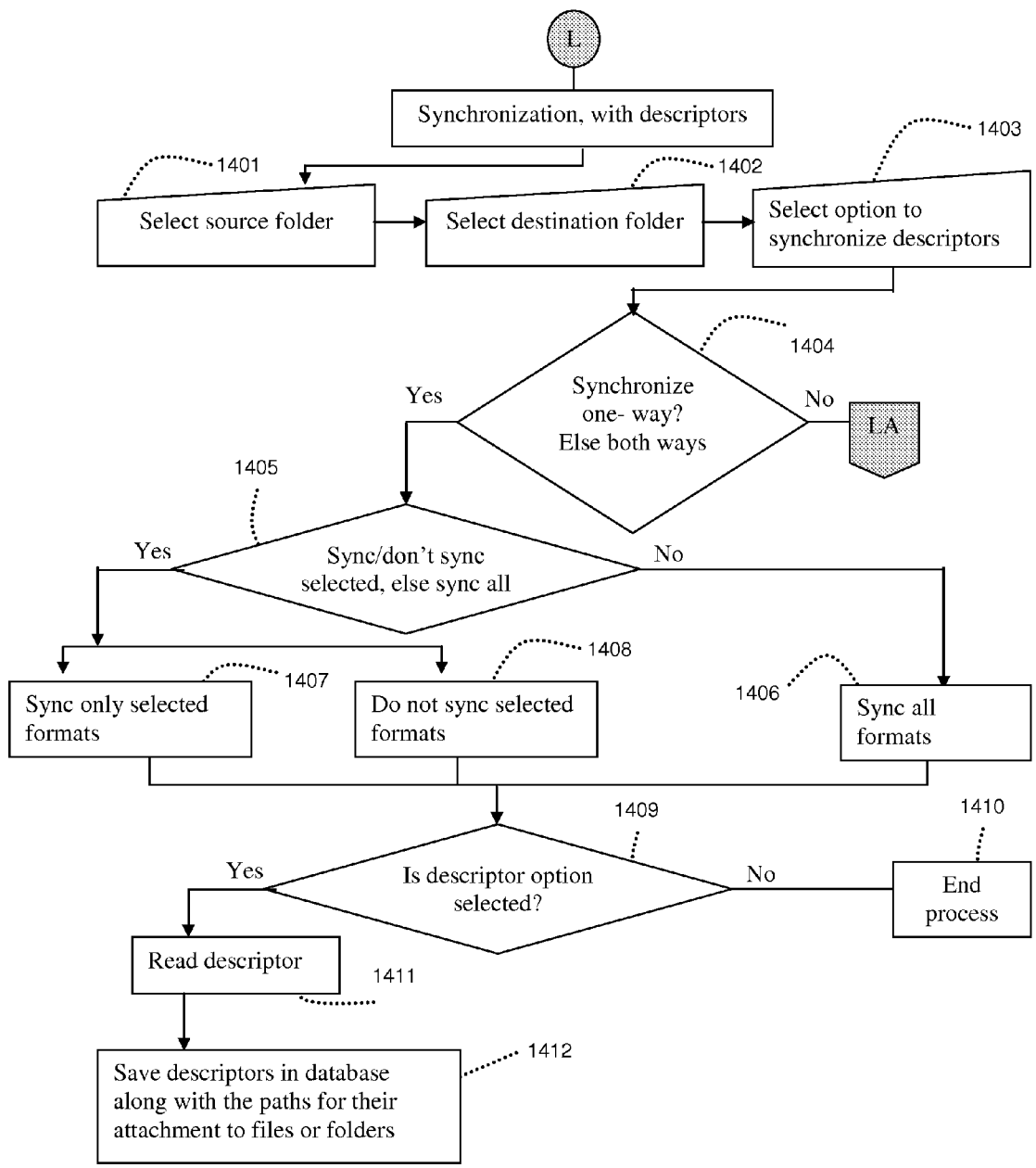
FIG. 14 explains the process of synchronization, which helps users synchronize their descriptors as well as their files and folders.

FIG. 14 explains the process of synchronization, which helps users synchronize their descriptors as well as their files and folders. It requires the user to select 1401 source folder, and then 1402 destination folder. The user selects option of synchronizing descriptors 1403; the user must then specify if he wants synchronization 1404 to occur one-way (only from the user's machine to another machine) or both ways (explained in FIG. 15). If the user selects one-way, he has an option 1405 to sync or not sync selected formats (viz. document file, excel file etc). If the option is chosen to sync/not sync selected formats 1405, the user has the option to choose at least one or more formats 1407 to sync or choose at least one or more formats to not sync 1408. Alternatively, the program will sync all formats 1406. The user then specifies whether descriptors option is selected 1409, if the option is selected the descriptor is read 1411 and saved 1412 in the database along with the paths for their attachment to files or folders else ending the operation 1410.

Figure 15:
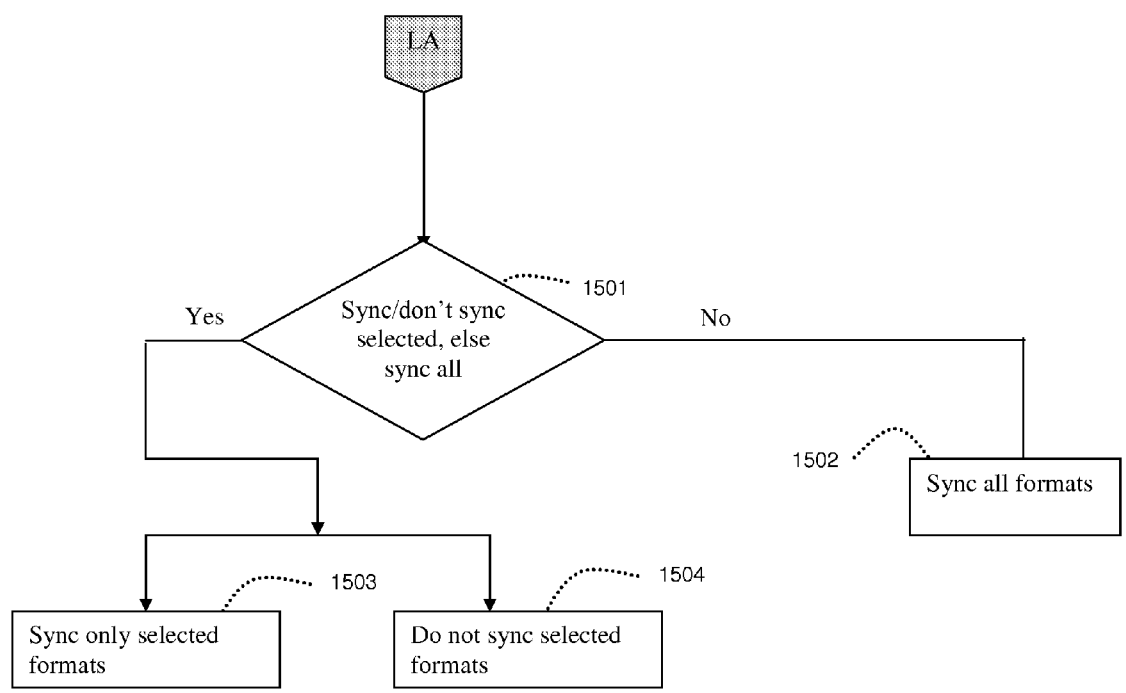
FIG. 15 continues from decision box 1403 where option "No" (meaning select sync both ways) leads to 1501.

FIG. 15 continues from decision box 1404 where option "No" (meaning select sync both ways) leads to 1501. The user has the option 1501 to sync or not sync selected formats (viz. document file, excel file etc). If the option is chosen to sync/not sync selected formats 1503, the user has the option to choose at least one or more formats 1504 to sync or choose at least one or more formats to not sync 1507. Alternatively, the program will sync all formats 1502.

Figure 16:
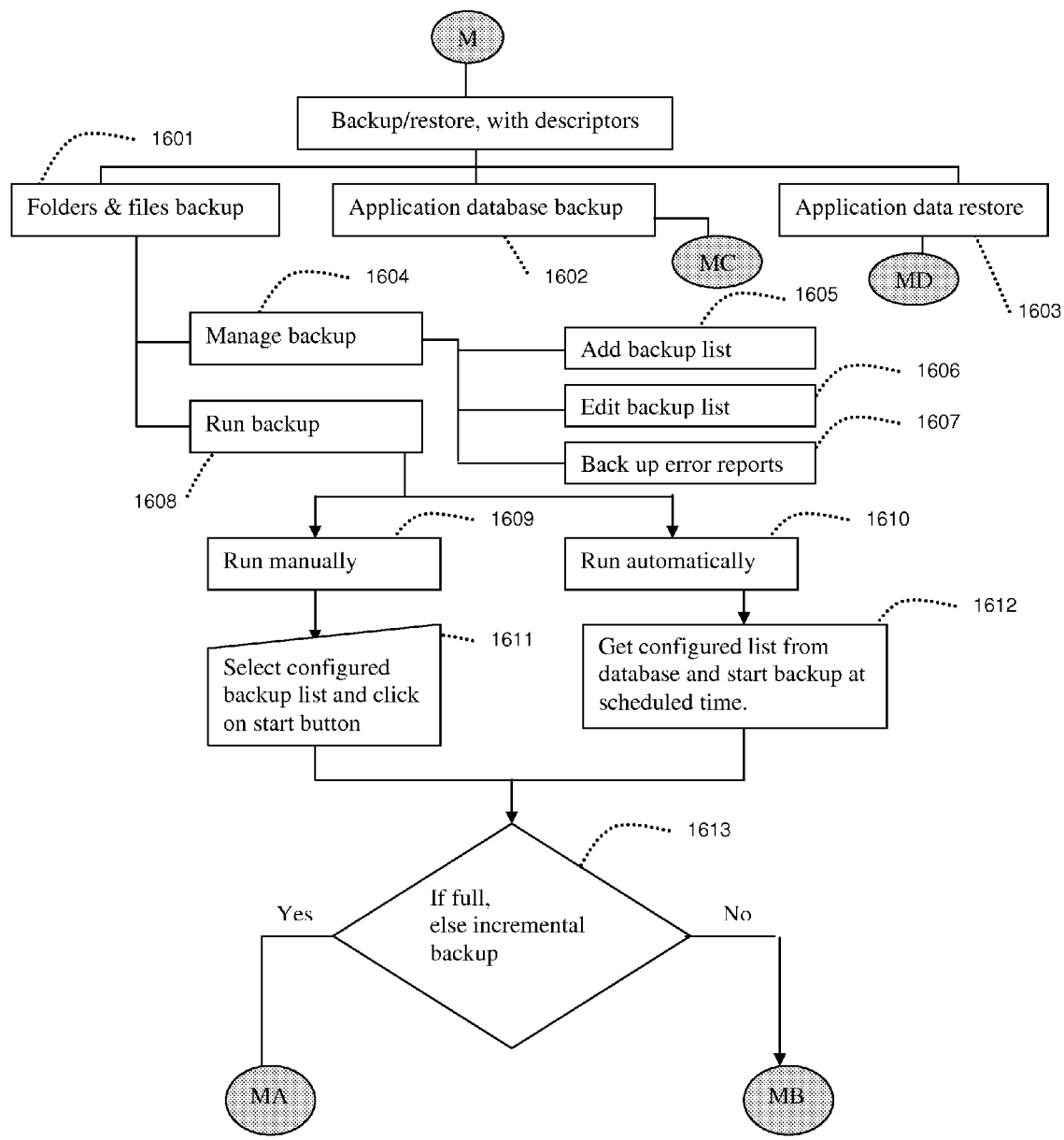
FIG. 16 explains the process of backup and restore.

FIG. 16 explains the process of backup and restore. The user has the option to select folder and file backup 1601, application database backup 1602 (details in FIG. 19) and application data restore 1603 (details in FIG. 20). The folder and file backup 1601 gives the user the option of managing the backup 1604 and run backup 1608. Managing backup can be done in two ways—by adding a backup list 1605 (by which the user selects the folders that need to be backed up) and editing the backup list 1606. If for any reason backup does not happen, the user will get a backup error report 1607. Running backup can be done in two ways—by running manual backup 1609 and running an automatic backup 1610. In case of manual backup, the user can select a configured backup list 1611 to go for full backup or incremental backup 1613 (details in FIG. 17 and FIG. 18). If the user selects automatic backup 1610 the application gets configured list from the database to begin at scheduled time 1612 to run full or incremental backup 1613.

Figure 17:
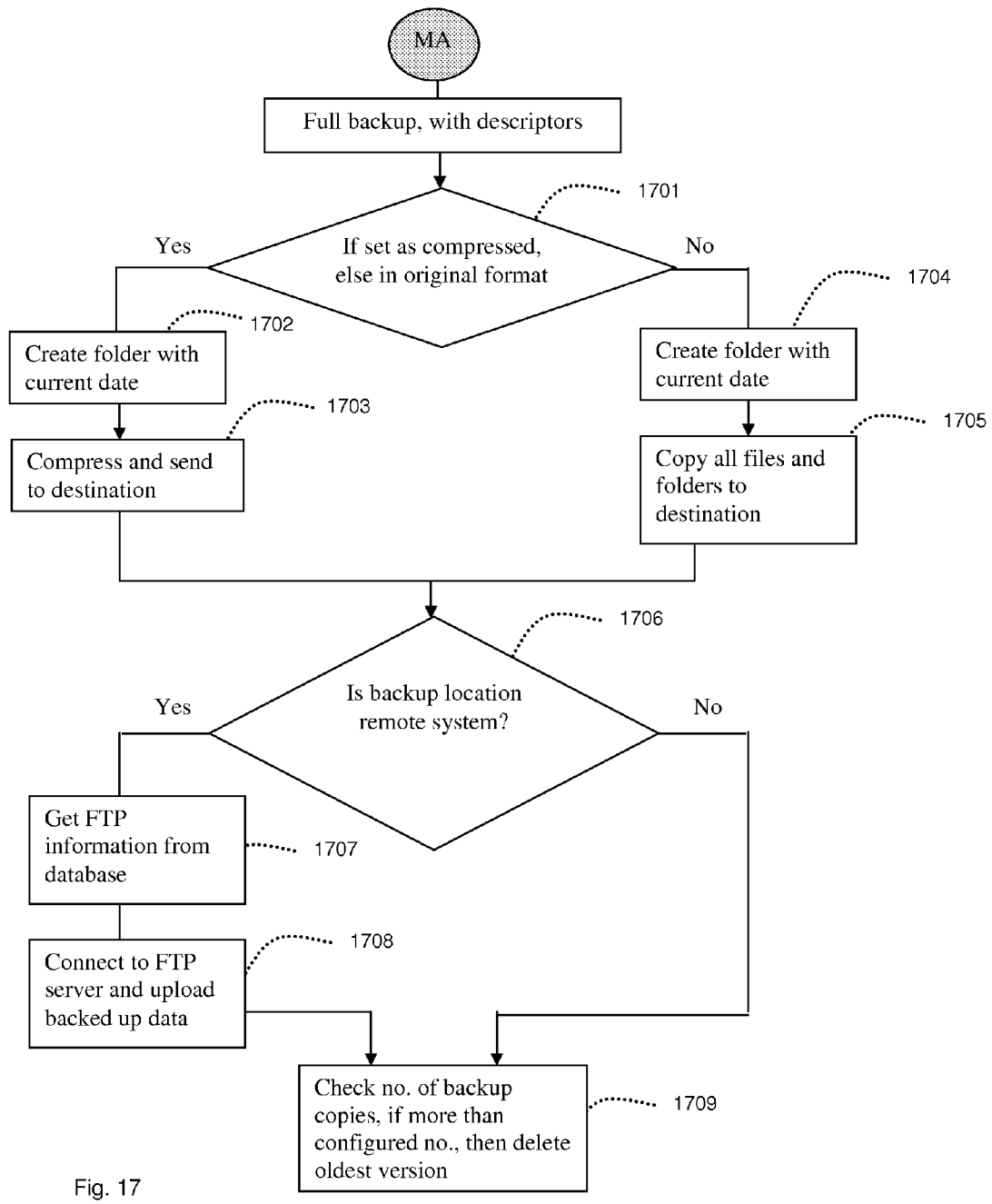
FIG. 17 explains the process of full backup.

FIG. 17 explains the process of full backup. The user has the option of backing up selected files and folders in a compressed (zipped) format or backing them up in their original, uncompressed format 1701. If the compress option is selected the application creates a folder with the current date 1702 and send it to the destination 1703. Alternatively, the application uses the original format to create a folder with the current date and time 1704 and copy all files and folders to the destination 1705. The application checks if the backup is configured for the user's machine, in an external device, in another machine in the local network, or to a remote location. If the backup location is a remote storage device 1706, the application gets the relevant FTP (file transfer protocol) information from the database 1707 to make an FTP connection and upload the backed-up data 1708. For either destination choice local or remote the application checks the number of backup copies 1709, and deletes the oldest version if the number of backup copies exceeds the configuration.

Figure 18:
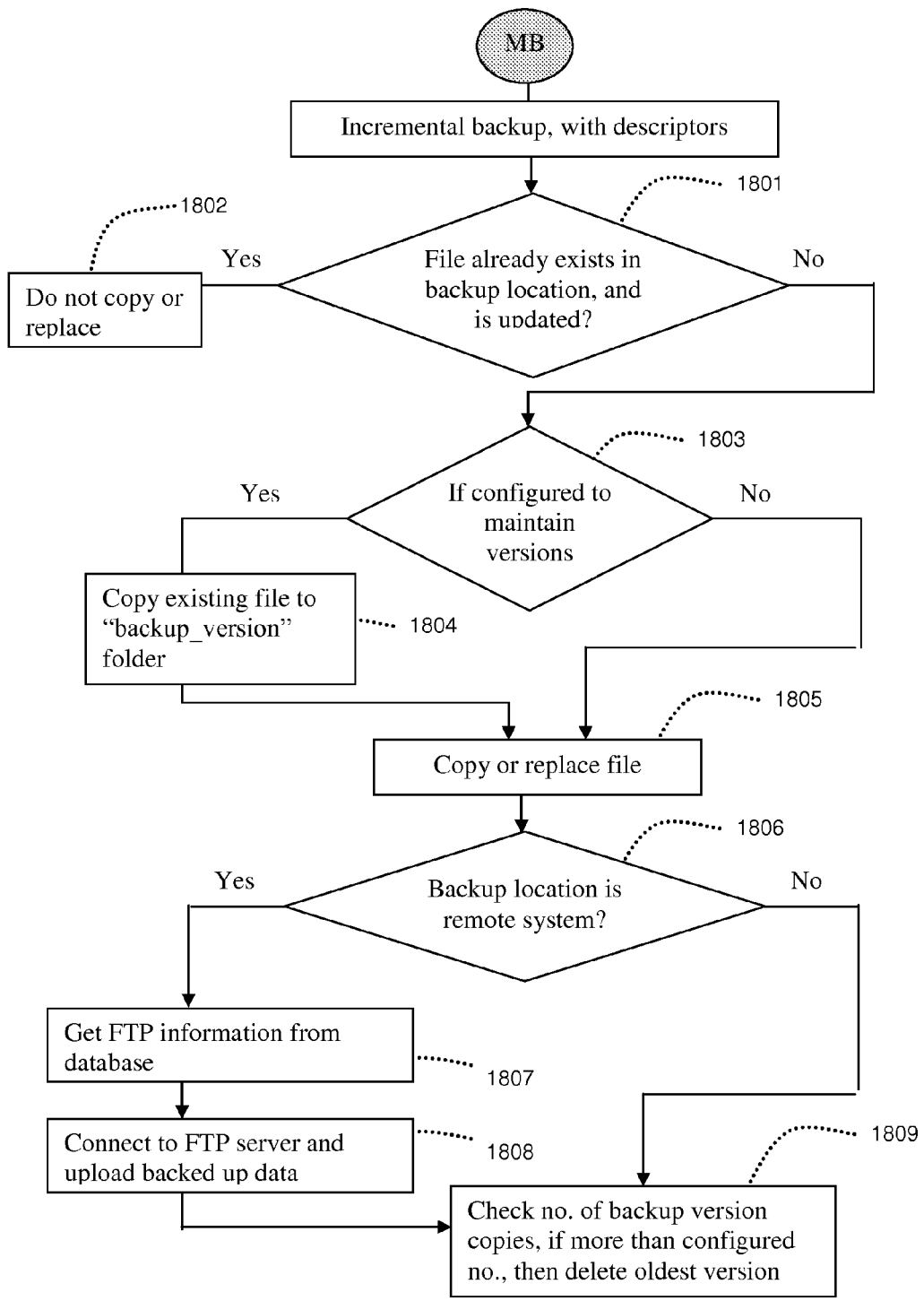
FIG. 18 represents the case of incremental backup.

FIG. 18 represents the case of incremental backup. The application checks 1801 whether a file already exists and is already fully updated; if it is, then the application does not replace it 1802; if (as when the user creates a new file or modifies an existing file after the last backup), the application copies or replaces the file 1805, after copying the existing backup file to a "backup version folder" 1804 if the user has configured the folder in which the original file is located for versioning 1803. The application checks 1806 whether the backup location is a remote storage device; if it is, the application gets FTP information 1807 from the database to create an FTP connection to the remote server and upload back up data 1808. In both cases (backing up locally or in remote location) the application checks the desired number of back copies, and if the number reached with the latest backup exceeds that number, then it deletes the oldest version 1809.

Figure 19:
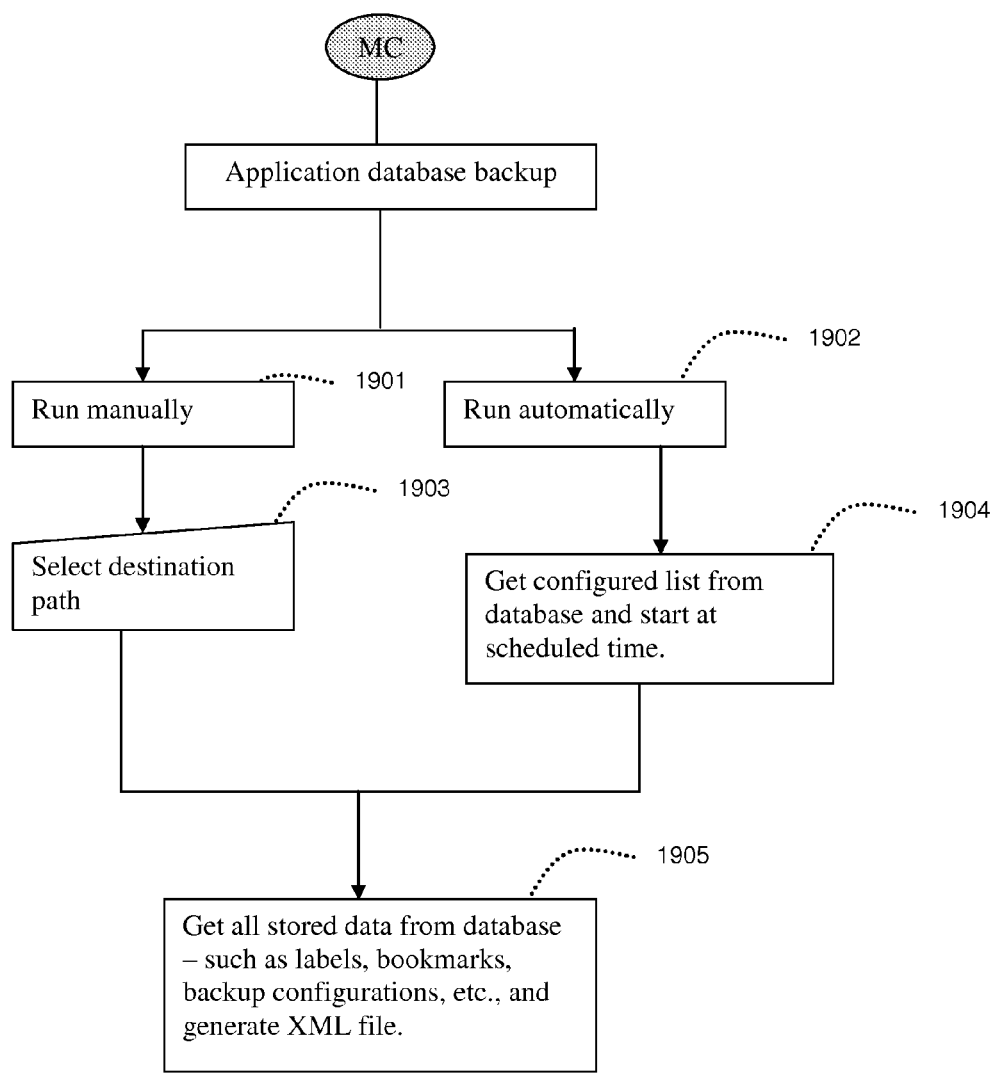
FIG. 19 explains the process of application database back up.

FIG. 19 explains the process of application database back up. The user can run a manual backup 1901 or an automatic backup 1902; for the manual backup, the user can select the destination path 1903. In case of automatic backup 1902, the application gets a configured list from the database and begins backup at a scheduled time 1904. In both cases (manual and automatic), the backup data is stored in an XML file 1905.

Figure 20:
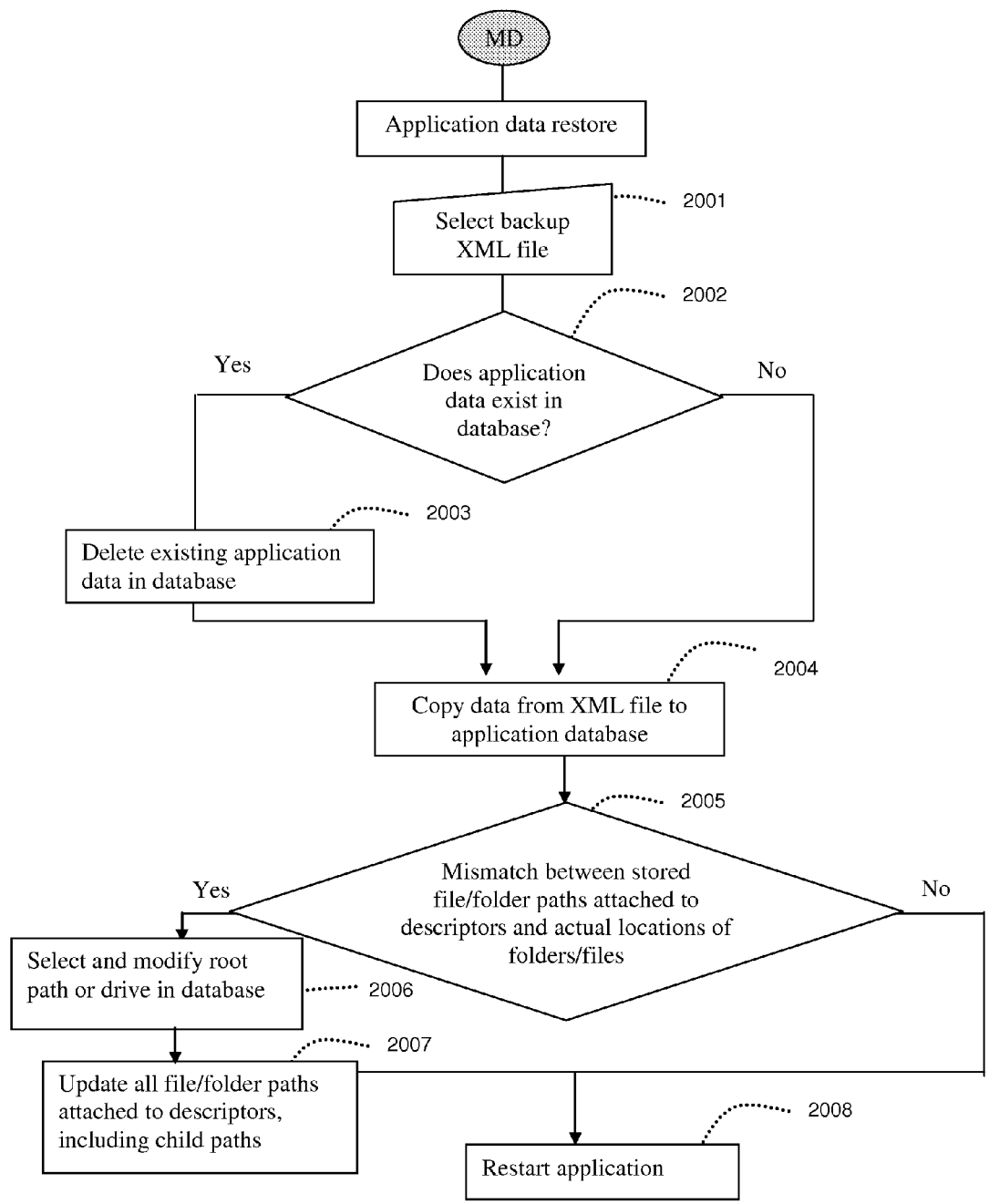
FIG. 20 shows the process of restoring the data created within the application in case of a hard disk crash or re-installation of the application, or when a user wishes to revert to an earlier state of the data.

FIG. 20 shows the process of restoring the data created within the application (e.g., backup and other configurations, file paths, reports, labels, bookmarks, groups, etc) in case of a hard disk crash or re-installation of the application, or when a user wishes to revert to an earlier state of the data. Assuming that the user has backed up the data in a place other than the application folder, preferably on another disk or machine, the user can select 2001 the backup file, which is in XML format; then, if the application finds 2002 application data in the database, it deletes this existing data 2003 and enters 2004 data from the XML file in the application database, which it does even when it does not find existing application data in the application database.

In case of renaming of the partitions of the drives in the process of replacement of crashed drives or as a result of upgrading to new drives, if the application finds 2005 a mismatch between stored file/folder paths attached to descriptors and actual locations of folders/files, then it displays 2006 the stored paths in a dialog box, allowing the user to modify 2007 the paths. When the user selects and modifies a root path saved in the database, all child/subordinate paths get automatically modified to match the change. The application then restarts 2008, which it also does when it does not find a mismatch between the stored paths of descriptors and the actual locations of the folders/files.

FIG. 21 represents the process of 'report' generation, which logs all actions taken in pre-determined areas of the system, including creation, modification, renaming, moving, and deleting files and folders. The user can determine the sources (machines, drives, directories, folders, etc.) 2101 in relation to which reports should be generated, and can see a "ticker" 2102 continuously displaying the actions in the selected sources as they happen, or directly view a viewable, exportable and printable report 2103.

To add sources 2101, the user can select the folder path 2104 and save the source 2105. The ticker 2102 option continuously alerts the user as 2106 files are modified, renamed, moved or deleted in a ticker window 2107. To view reports 2103, the user can select 2108 the sources for which reports are required, and criteria for reporting (e.g., modified or deleted files, or renamed folders, etc.) 2109 and the date range for the report's coverage 2110. If the user selects one or more file types 2111, the report will show only the selected file types 2112, or else it will display reports related to all files in the selection 2113.

FIG. 22 shows the 'descriptor management' process. The user can export descriptors 2201 or import descriptors 2202 (details in FIG. 23) or create new/manage descriptor 2207. If the user chooses to export descriptors, he can select a destination path 2203; the system checks authorization 2204 related to specific descriptors, then the application fetches the descriptors from the database 2205, and generates an XML file containing the hierarchy of descriptors 2206 at the destination.

FIG. 23 continues with the 'descriptor management' process at the receiver end, where the user can select 2301 one of several imported XML files containing hierarchies of descriptors, and get a display of a "tree view" (hierarchical views), or alphabetical list view if desired, of the descriptor hierarchy 2302. The user has the option of dragging and dropping 2303 or selecting and transferring the desired descriptors 2304 to hierarchy of descriptors. In both cases, the application checks 2305 whether a descriptor already exists at the same hierarchical level in the user's system; if it does, the application will not copy the descriptor 2306, else it will copy the descriptor 2307.

Figure 24:
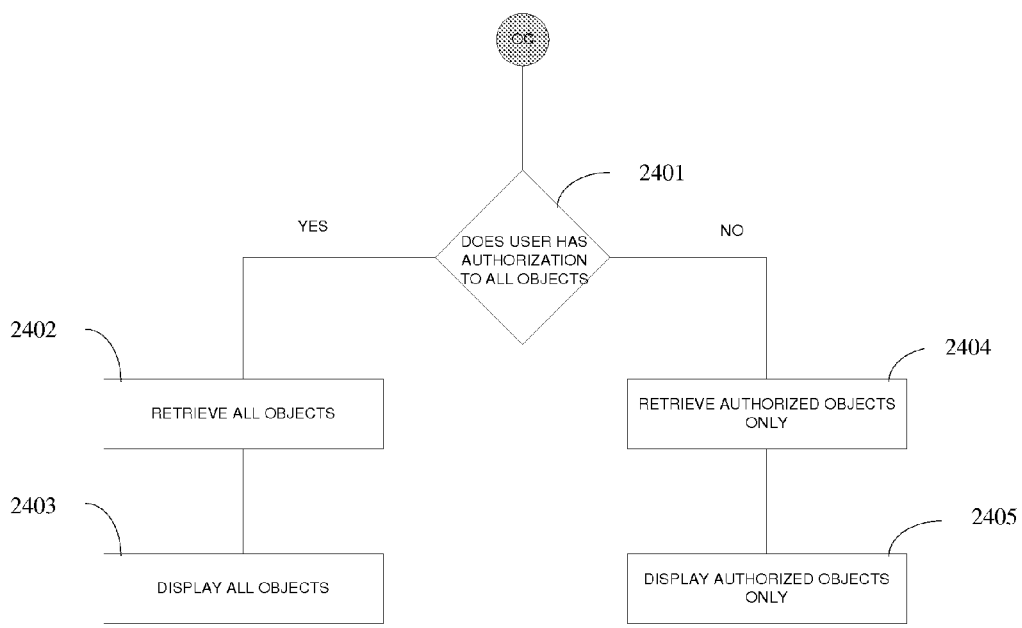
FIG. 24 explains the option of "limiting the authorization of the application" to the user by providing controlled access to respective users.

FIG. 24 describes controlled user rights to send or receive descriptors. The descriptors would be exhibited to different users differently as per the restrictions employed by authentication verification. 2401 checks whether the user has authorized rights to send or receive all descriptors, if yes then 2402 retrieves all descriptors and 2403 exhibits the results; else if not authorized for all then 2404 retrieves only authorized descriptors and 2405 exhibits the accessible descriptors only.

Figure 25:
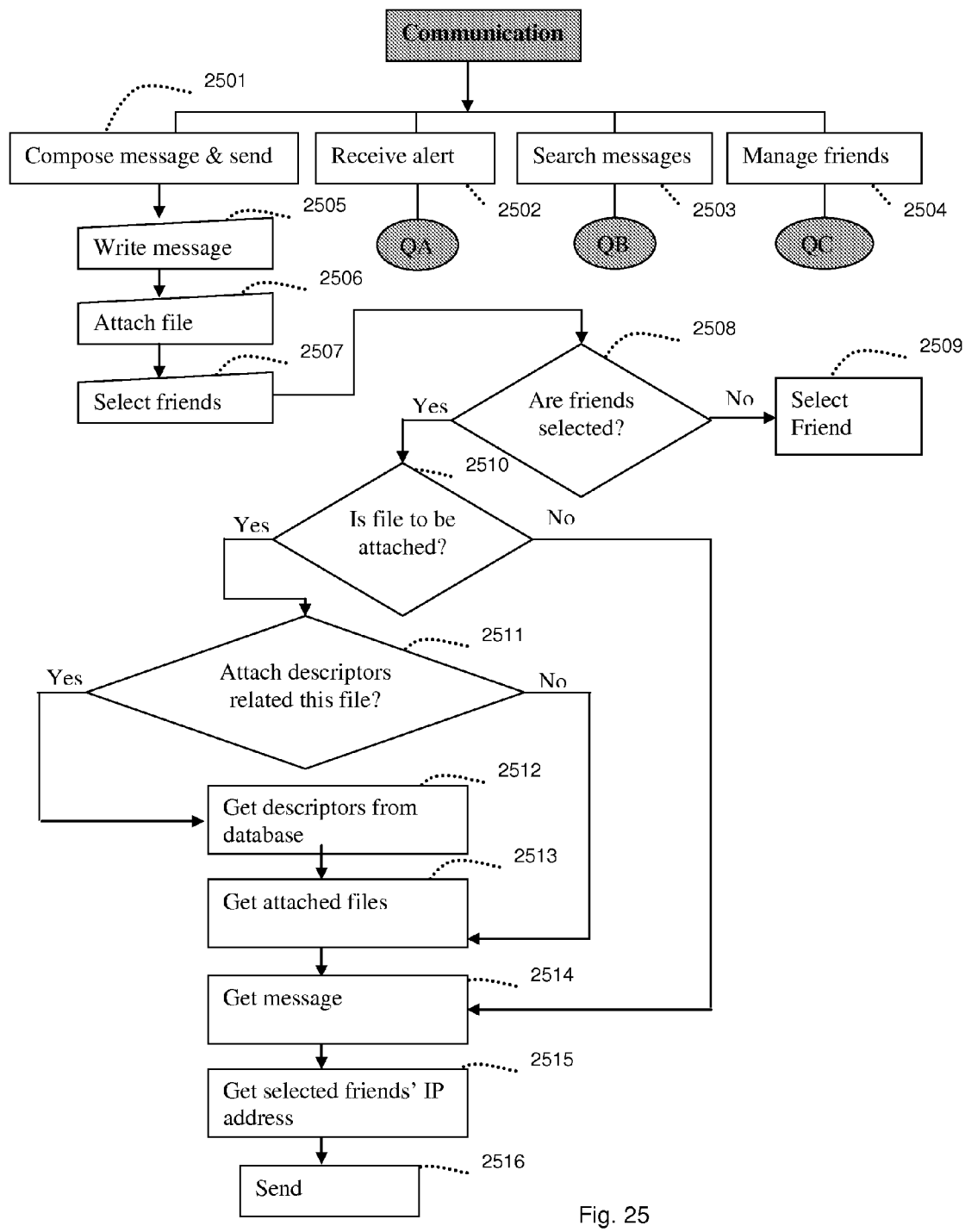
FIG. 25 explains the process by which user can share, forward and receive files and folders along with their descriptors.

FIG. 25 describes a communication process by which a user can share, forward and receive files and folders along with their descriptors. The figure also describes the details of the process of a user as a sender for composing message and sending 2501 with or without descriptors, as a receiver for receiving alert 2502 on reception of a message, a searcher for searching message 2503 and a mechanism of managing contacts 2504. The process involves the general concept of composing a message and sending 2501. In a related aspect the composing of message involves writing the message in a text box 2505, attaching file or folder 2506 to the message, selecting one or more contacts 2507 (other users) to send the message to, checking whether contact selected 2508, if not selected 2509, selecting the contacts and if selected 2510 then checking whether any file is required to be attached, if yes then check for descriptors to be attached 2511, if the descriptors are required to be attached then get the descriptors from the database 2512 and the files to be attached 2513. Get the message 2514 and get the IP address of selected contacts 2515 where message is to be sent and send the message 2516.

Figure 26:
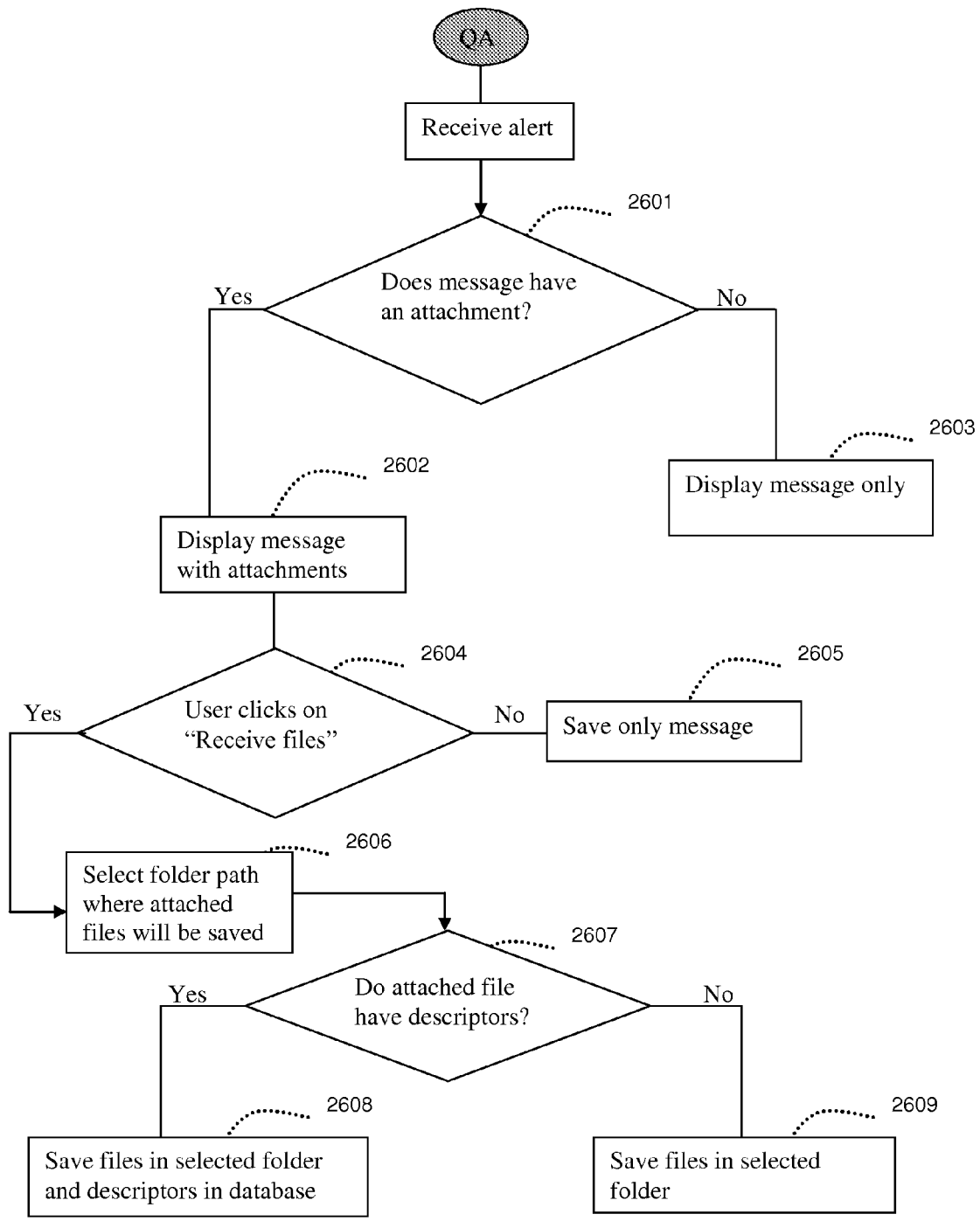
FIG. 26 explains the process of a user as a receiver receiving files or folders along with their descriptors and along with a message from another user.

FIG. 26 shows the process of a user as a receiver receiving a message along with attachments 2601 from another user; the attachments are files or folders along with their descriptors. The process involves the message being displayed on the receiver's screen in a 'pop-up' alert, indicating to the receiver whether files or folders are attached 2602 to the message or not 2603; and allowing the receiver to accept the attachments or to refuse the attachments, following which the receiver 2604 can save the message only 2605 or select the folder on his/her machine where the attached files and folders may be saved 2606, checking for descriptors with files 2607 after which the system saves the files in the selected folder and the descriptors in the database 2608 else saves the files in selected folder 2609. The user may have the right to accept or not accept the files or descriptors.

Figure 27:
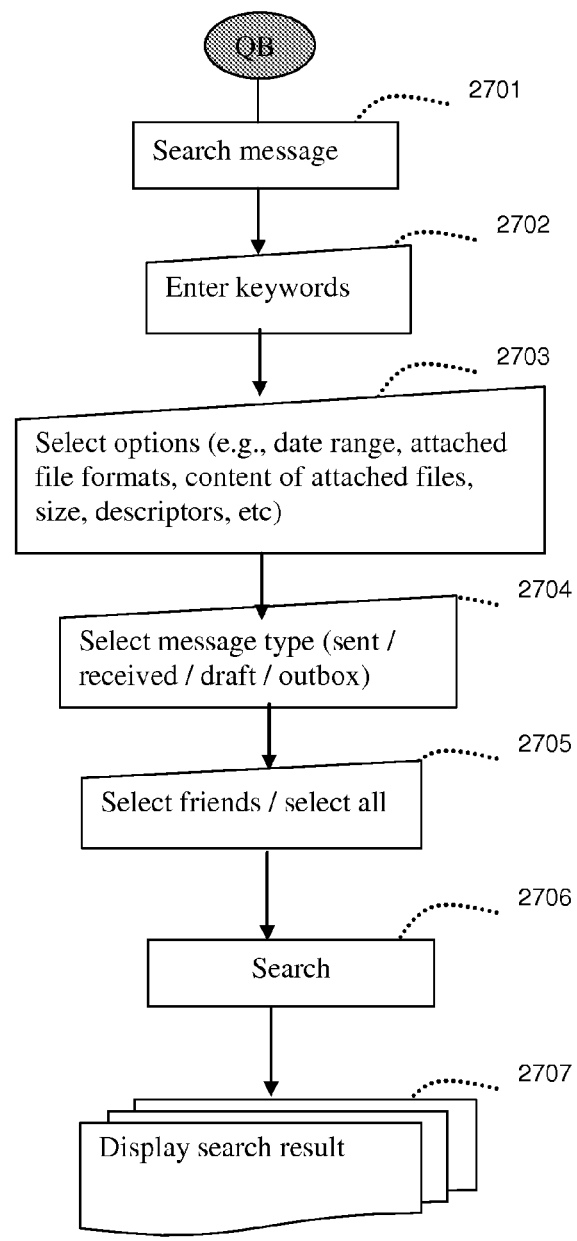
FIG. 27 explains how a user can search for a file appended with descriptors.

FIG. 27 shows how a user can search 2701 for a file shared thus (as in FIG. 26) or a message attached to a file through the messaging system or its parts (e.g., all messages, or those in the inbox, sent, draft or outbox folders) by entering keywords 2702 in a text box, using various options 2703 to define the search better (e.g., one or more contacts who may have sent the messages or received them from the user, date range, formats of attached file, content of attached files, size, descriptors, etc.). The mechanism selects the message type (e.g., inbox, sent, etc.) 2704, the contacts 2705 and then performs the search 2706 before displaying the result 2707.

Figure 28:
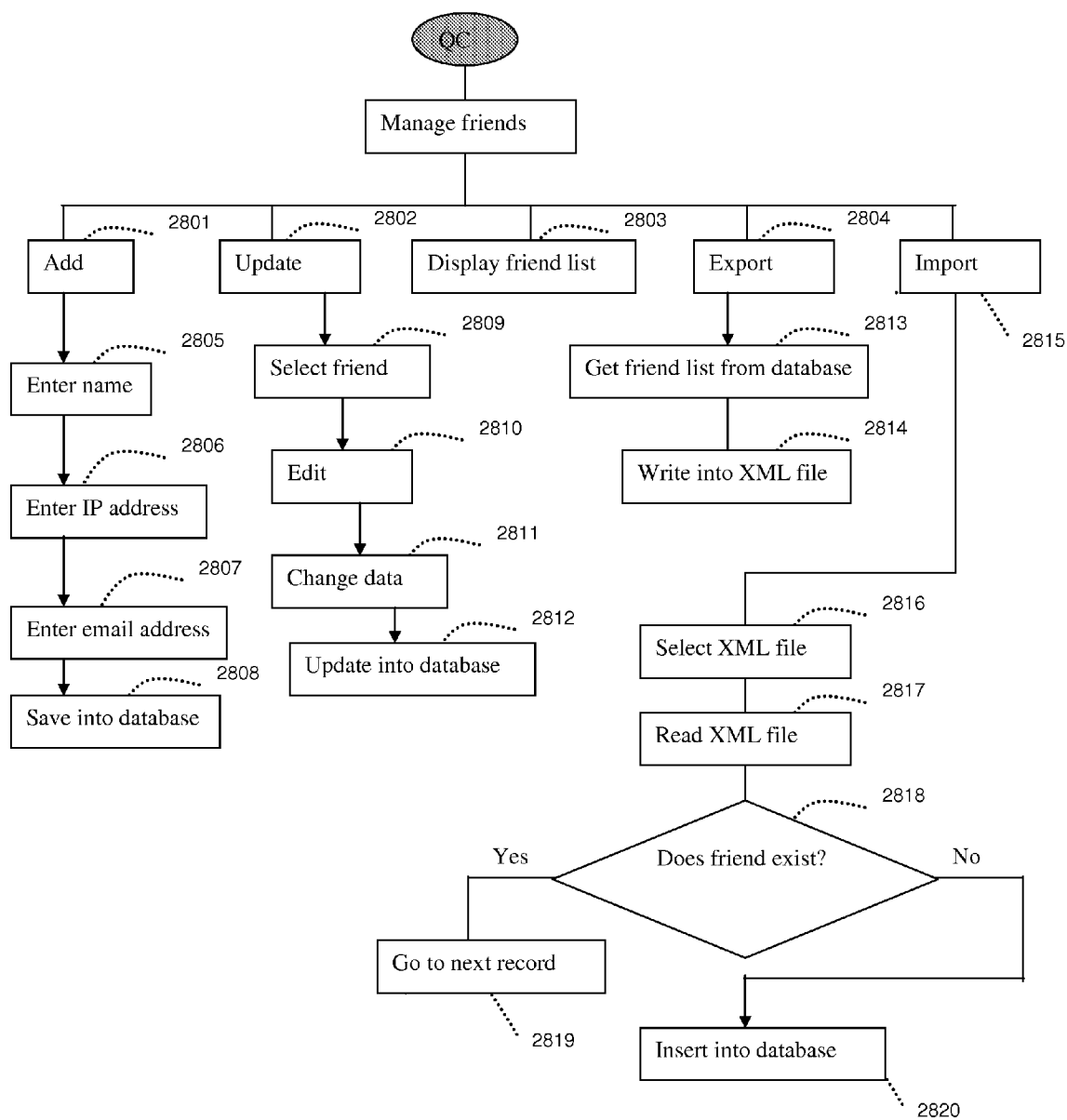
FIG. 28 shows users contact system management by adding and updating information about contact and displaying it.

FIG. 28 shows how a user's contact system is managed by adding 2801 and updating 2802 information about a contact, and displaying 2803 it. The contact system also allows the users to export 2804 his/her contacts to other users and to import 2815 others' contact lists, the processes for which are shown in this figure; the adding 2801 of contact happens by entering the name 2805, IP address 2806, email address 2807 of the contact and saving it into the database 2808; the update on information happens by selecting the contact 2809, editing 2810 the existing information, changing the data 2811 and saving the update into the database 2812; the export happens by extracting relevant data 2813 from the database and writing the data into an XML file 2814 that can be forwarded or shared with others; the import 2815 happens by selecting 2816 and reading 2817 to get the relevant XML file and extracting data 2818 from it and adding it to the receiver's database 2820 if not existing else moving the next record 2819.

Figure 29:
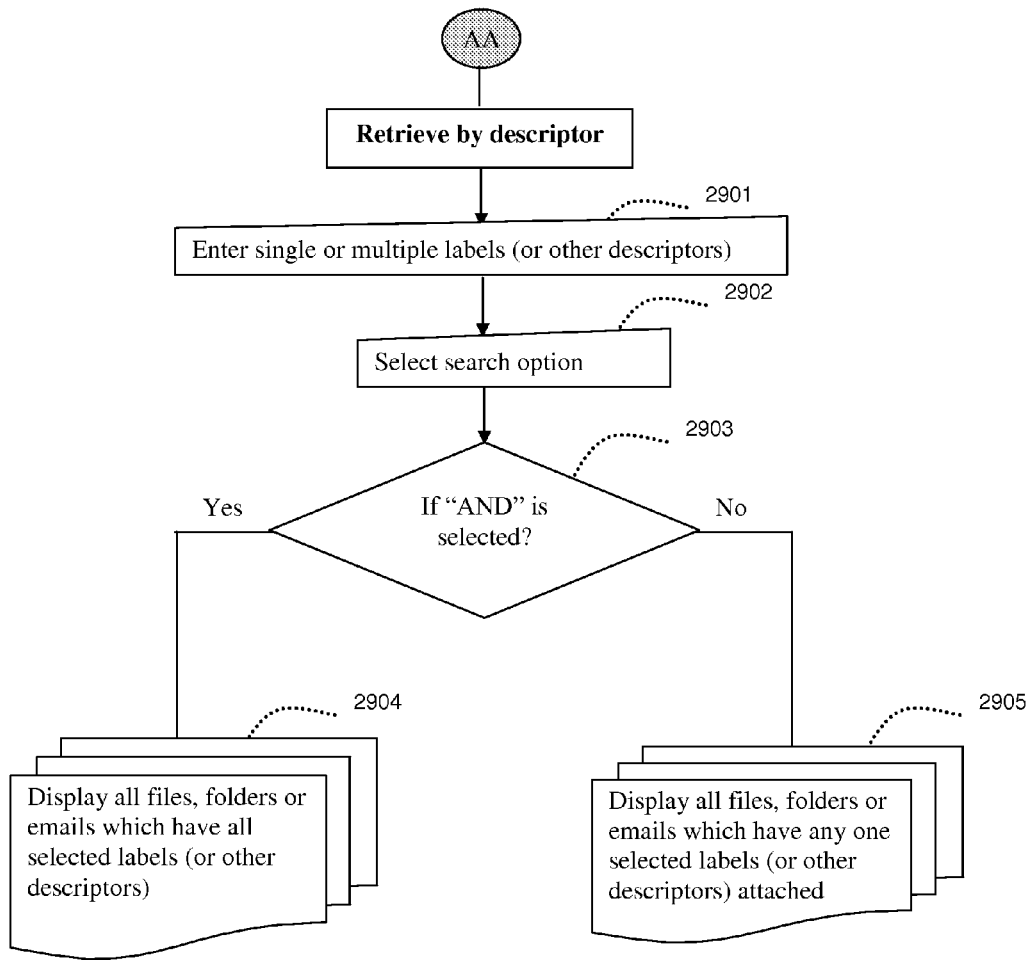
FIG. 29 shows file retrieval by use of descriptors.

FIG. 29 shows how a user can retrieve files and folders with the use of descriptors. To retrieve files or folders quickly, the user can either select labels or other descriptors from a list displaying such descriptors or write them into single or multiple text boxes 2901, which method can be used in conjunction with the method described for getting lists of files, folders or emails shown in FIG. 3 to add filters to narrow the search. The search 2902 can be performed with Boolean operator options available 2903. Combined results are displayed with AND operator 2904 and confined results are displayed with OR operator 2905 option.

Figure 30:
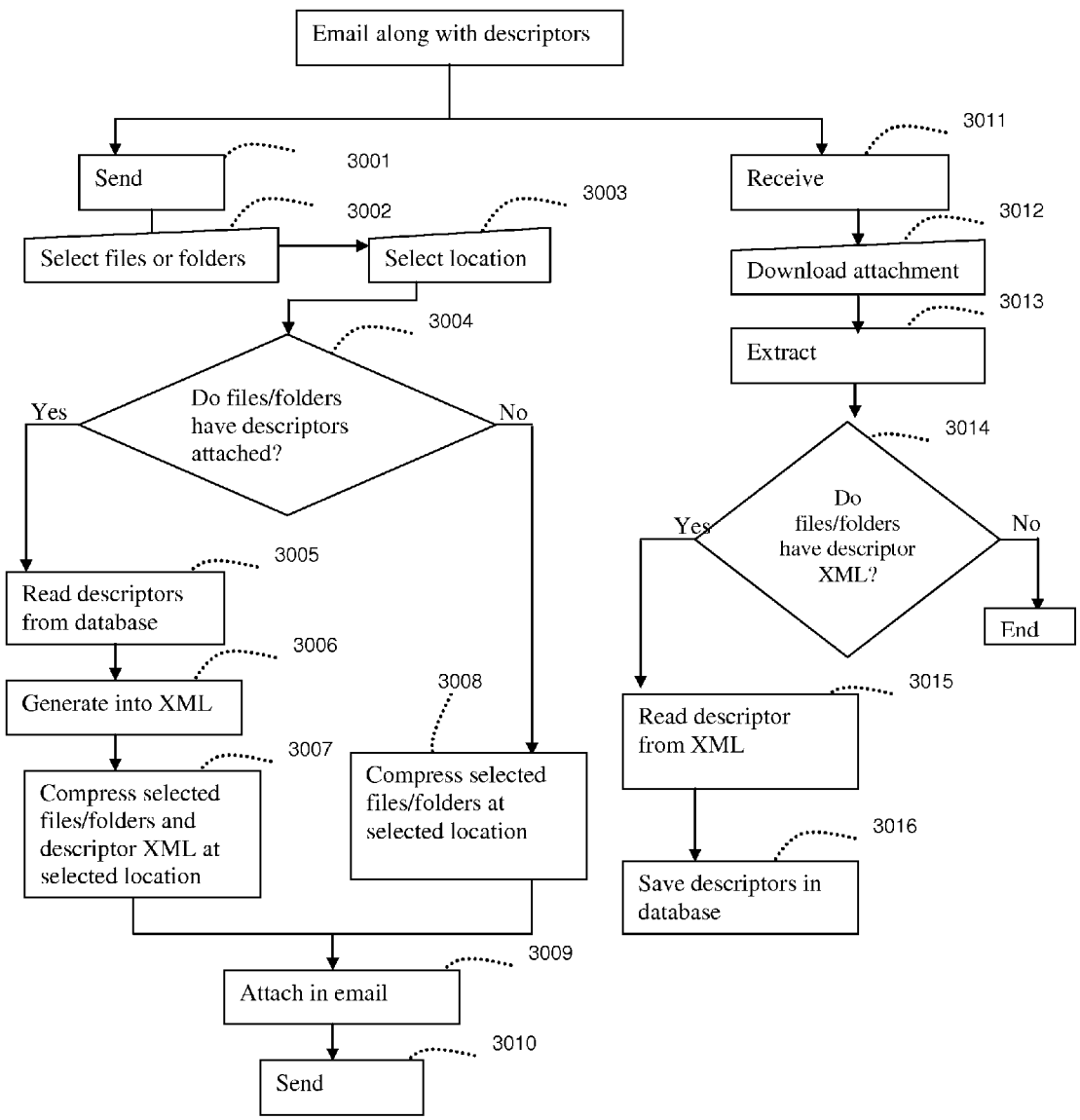
FIG. 30 explains email management system by use of descriptors.
Figure 31:
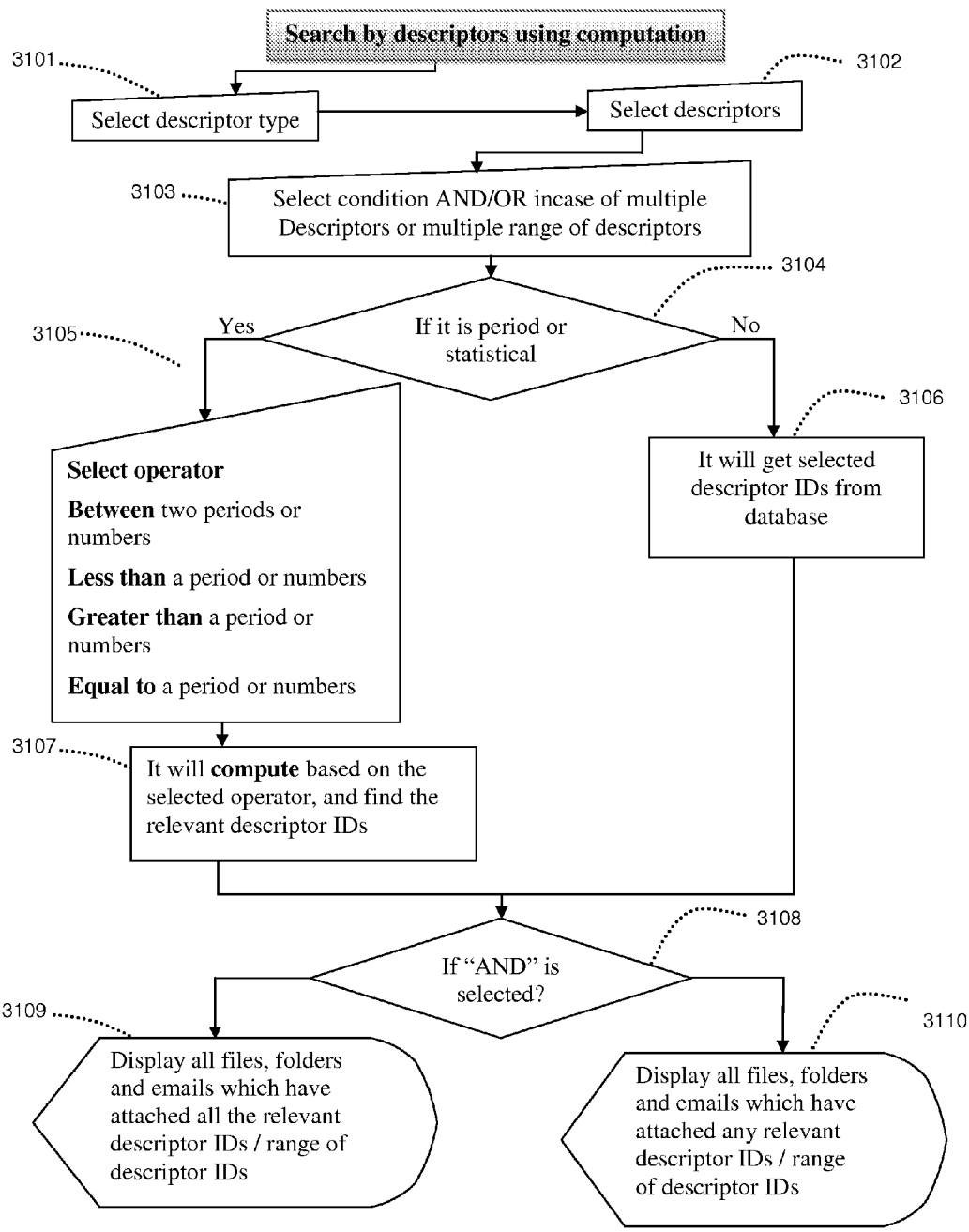
FIG. 31 explains how searching by at least one of the descriptors using computation is performed.

FIG. 30 explains email management by utilizing descriptors. The sending 3001 happens when file or folder to be sent is selected 3002, the location of the file is selected 3003, checking 3004 whether files or folders have descriptors attached to them, if yes then the descriptors are read from the database 3005 and XML file is generated 3006, the file or folder and attached descriptors are compressed 3007, if no descriptors then only files or folders are compressed 3008, the contents are then attached in the email 3009 and send 3010; the reception 3011 happens with downloading the attachment 3012, extracting the contents 3013, checking for any descriptors XML attached with the file or folder 3014, if yes reading 3015 and saving the descriptors in database 3016 else ending the operation.

The descriptors described in the current invention are different, and they can be of various types, e.g., period, numeric financial, etc., besides the standard alphanumeric labels that have been hitherto applied. The advantages in the use of such descriptors is that users can use them to search for files, folders and emails by descriptor range, and by values that are outside the content of the files to which the descriptors apply.

For example, if a user has attached 'period' type descriptors (to files, folders and emails), she can search through a period range besides using other means, such as normal, alphanumeric keywords, to find the relevant files, folders and emails. The outcome is a sharp improvement in the search results through a winnowing out of the unwanted.

Similarly, statistical descriptors render themselves amenable to statistical computation. In another variation of this type of descriptors, that is, financial descriptors, the descriptors render themselves amenable to computation. Thus, for example, if an analyst marks different scores to various company-related files, folders or emails, and wishes to get a selection of files related to companies that have registered a three-year compound annual growth rate (CAGR) of equal to and more or less than a desired amount, all that is needed is to ask the present invention to use take the numbers entered in numerical labels, use the data in them to calculate the CAGRs, and show a list of files related to companies whose CAGR growth matches the desired conditions.

We can search by descriptor range in the case of period, statistical and financial types of descriptors. First, the search referred to in the current invention will find the relevant descriptors in the database that come into the range defined by the user, and then it will display the files, folders and emails to which to the particular descriptors are attached.

We can also create other combinations to narrow down the search results, including those that refer to document types, keywords in file content, file size, etc.

We can also search by multiple descriptor ranges with the AND/OR condition.

As per the invention searching by at least one of the descriptors is performed using computation. The searching by at least one of the descriptors using computation is initiated by firstly selecting at least one descriptor type (3101). Thereafter, descriptors are selected (3102). In case of multiple descriptors or multiple ranges of content of the descriptors are selected logical operators are applied (3103). If the selected descriptor is a period, statistical descriptor (3104), for e.g. selected descriptor is period, the operator may be range between two periods or numbers, less than a period or number, greater than a period or number or equal to a period or number (3105). Further, it will compute based on the selected operator and find the relevant descriptor (3107). If the selected descriptor is not a period, statistical descriptor, the at least one descriptor ID referring to the selected descriptor will be selected from database (3106). All files, folders and emails which having attached all the relevant descriptor IDs/range of descriptor IDs are displayed (3109) if the resultant relevant descriptors are subjected to logical AND operator (3108). Alternatively, all files, folders and emails which having attached any of the relevant descriptor IDs/range of descriptor IDs are displayed (3110).

While the present invention has been described with reference to one or more exemplary embodiments, it will be understood by those skilled in the art that various changes can be made in respect of the types of descriptors, without departing from the scope of the present invention. In addition, many modifications can be made to adapt a particular geometry or dimension to the teachings of the disclosure without departing from the scope thereof. Therefore, it is intended that the present invention not be limited to the particular embodiment (s) disclosed as the best mode contemplated, but that the invention will include all embodiments falling within the scope of the appended claims.

The invention claimed is:

1. A system configured for extracting, retrieving, and managing objects in a network of computers or a computer, the system comprises:
   at least one host terminal including:
   at least one control module configured for initialization, control, and execution of operation of the system;
   a descriptor generating and managing (DGM) module generating at least one generated descriptor, wherein the DGM module manages the at least one generated descriptor of at least one of a plurality of different data types and hierarchies of the at least one generated descriptor of the at least one of the plurality of different data types;
   a descriptor appending module (DA) for appending at least one appended descriptor of the at least one generated descriptor to each of the objects automatically wherein the DA module is configured for:
     automatically checking whether a selection of one of the objects is an email or not;
     obtaining a unique ID of the email if the selection is the email and storing the unique ID along with the at least one appended descriptor in at least one database; and
     obtaining path(s) of files(s) or folder(s) if the selection is the file(s) or the folder(s) respectively and storing the path(s) of the file(s) or the folder(s) and the at least one appended descriptor in the at least one database;
   the at least one database for storing the at least one appended descriptor along with a link to the one of the objects;
   a control and monitoring module configured for sharing, importing, exporting, and synchronizing the at least one generated descriptor of the at least one of the plurality of different data types with the hierarchies of the at least one generated descriptor of the at least one of the plurality of different data types across the network and the at least one appended descriptor stored in the at least one database thereby:
     facilitating controlled access to the objects; and
     providing reports of activity in terms of the file(s) or the folder(s) created, modified, opened, renamed, moved and deleted;
   a back-up module configured for flexible and configurable backup of information regarding the objects and the at least one generated descriptor, the backup module configured for maintaining copies of the file(s) and the folder(s) plus a mapping of the path(s) of the file(s) and the folder(s) in a directory system, and the link between the at least one appended descriptor and the path(s) across the network wherein the link between the at least one appended descriptor and the path(s) are manifest as an attachment to the file(s) and the folder(s);
   a search module for executing a search mechanism to perform a search query based on the at least one appended descriptor stored in the at least one database; and
   means for retrieving the objects wherein the objects are retrieved through computation of the at least one appended descriptor, wherein computation locates a descriptor of numeric or date range or Boolean logic.

2. The system as claimed in claim 1, wherein the management of the objects by the DGM module is relevant to the objects in directory management and email management.

3. The system as claimed in claim 1, wherein the objects are data objects.

4. The system as claimed in claim 1, wherein the at least one control module configured for initialization, control, and execution of operation of the system provides limited network authorization to a user for controlling use of an application within the network.

5. The system as claimed in claim 1, wherein the at least one generated descriptor includes bookmarks, labels, priorities, groups, period or duration, statistical or financial descriptors, permissions, and comments.

6. The system as claimed in claim 1, wherein the control and monitoring module configured for sharing, importing, exporting, and synchronizing the at least one generated descriptor facilitates controlled access to objects having the same descriptor of the at least one appended descriptor.

7. The system as claimed in claim 1 further comprises a server for executing a desired operation in the network.

8. The system as claimed in claim 1, wherein the at least one generated descriptor and the objects are synchronized based on a selected synchronization format.

9. The system as claimed in claim 1, wherein the backup is automatic or manual.

10. The system as claimed in claim 1, wherein the control and monitoring module for sharing, importing, exporting, and synchronizing the at least one generated descriptor is a link or a wireless medium.

11. The system as claimed in claim 1, wherein results of the search query are displayed in a synchronized manner by selecting a synchronization format.

12. The system as claimed in claim 1, wherein the at least one generated descriptor is edited, created, or deleted as desired by a user.

13. The system as claimed in claim 1, wherein the system obviates duplication of the objects as the at least one generated descriptor is shared and the at least one appended descriptor is linked with each of the objects.

14. A method of extracting, retrieving, and managing objects in a network of computers or a computer, the method comprising:
   selecting at least one selected object;
   generating at least one generated descriptor, wherein the at least one generated descriptor is at least one of a plurality of different data types, said at least one generated descriptor being generated by a descriptor generating and managing (DGM) module, wherein the DGM module manages the at least one generated descriptor of the at least one of the plurality of different data types and hierarchies of the at least one generated descriptor of the at least one of the plurality of different data types;
   appending at least one appended descriptor of the at least one generated descriptor to the at least one selected object, wherein appending the at least one appended descriptor to the at least one selected object comprises steps of:
      automatically checking whether the at least one selected object is an email or not;
      obtaining a unique ID of the email if the at least one selected object is the email and storing the unique ID along with the at least one appended descriptor in a database; and
      obtaining path(s) of files(s) or folder(s) if the at least one selected object is the file(s) or the folder(s) respectively and storing the path(s) of the file(s) or the folder(s) and the at least one appended descriptor in the database;
   storing the at least one appended descriptor of the at least one selected object in the database along with a link to the at least one selected object;
   managing the at least one appended descriptor of the at least one of the plurality of different data types controlling access to the file(s) and the folder(s);
   performing a search query based on the at least one appended descriptor that is stored in the database processed by a search mechanism executing the search process in order to retrieve search results after verification of authentication in response to the search query;
   retrieving at least one stored object associated with the at least one appended descriptor, wherein the at least one stored object is retrieved through computation of the at least one appended descriptor, and wherein the computation locates at least one descriptor of numeric or date range or Boolean logic;
   sharing, importing, exporting, and synchronizing the at least one generated descriptor of the at least one of the plurality of different data types with the hierarchies of the at least one generated descriptor of the at least one of the plurality of different data types across the network and the at least one appended descriptor stored in the at least one database thereby:
      facilitating controlled access to the at least one stored object; and
      providing reports of activity in terms of the file(s) or the folder(s) created, modified, opened, renamed, moved and deleted;
   previewing preview information about the at least one stored object by exhibiting the at least one appended descriptor; and
   securing a flexible and configurable backup of backup information regarding the at least one stored object and the at least one generated descriptor, the flexible and configurable backup comprising steps of:
      maintaining copies of the file(s) and the folder(s) plus a mapping of the path(s) of the file(s) and the folder(s) in a directory system; and
      maintaining a record of the link between the at least one appended descriptor and the path(s) across the network, wherein the link between the at least one appended descriptor and the path(s) are manifest as an attachment to the files and the folders.

15. The method as claimed in claim 14, wherein the management of the at least one stored object is relevant to the at least one stored object in directory management and email management.

16. The method as claimed in claim 15, wherein an email object sent or received is optionally appended with the at least one appended descriptor and the at least one appended descriptor is saved in the database at a receiver side for ease in further communication and referencing.

17. The method as claimed in claim 14, wherein options for conducting the search process comprise Boolean operators.

18. The method as claimed in claim 14, wherein the at least one stored object is a file, folder, message, or the email.

19. The method as claimed in claim 14, wherein the at least one generated descriptor includes bookmarks, labels, priorities, groups, period or duration, statistical or financial descriptors, permissions and comments.

20. The method as claimed in 14, wherein the at least one appended descriptor and the at least one stored object are synchronized based on a selected synchronization format.

21. The method as claimed in claim 14, wherein the preview information about the at least one stored object is regarding contents, characteristics, properties, and a description of the object.

22. The method for managing data as claimed in claim 14, wherein a report is automatically generated for a respective task or operation performed on the at least one stored object.

23. The method as claimed in claim 14, wherein the at least one generated descriptor is edited, created, or deleted as desired by a user.

* * * * *